United States Patent
Migliori

(10) Patent No.: US 12,061,582 B2
(45) Date of Patent: *Aug. 13, 2024

(54) NO-CODE, EVENT-DRIVEN EDGE COMPUTING PLATFORM

(71) Applicant: Douglas T. Migliori, Newport Coast, CA (US)

(72) Inventor: Douglas T. Migliori, Newport Coast, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 17/861,030

(22) Filed: Jul. 8, 2022

(65) Prior Publication Data

US 2022/0342863 A1   Oct. 27, 2022

Related U.S. Application Data

(63) Continuation of application No. 16/788,299, filed on Feb. 11, 2020, now Pat. No. 11,416,459, which is a (Continued)

(51) Int. Cl.
*G06F 16/215* (2019.01)
*G06F 16/16* (2019.01)
(Continued)

(52) U.S. Cl.
CPC .......... *G06F 16/215* (2019.01); *G06F 16/168* (2019.01); *G06F 16/1724* (2019.01);
(Continued)

(58) Field of Classification Search
CPC .. G06F 16/215; G06F 16/168; G06F 16/1724; G06F 16/2272; G06F 16/2379;
(Continued)

(56) References Cited

U.S. PATENT DOCUMENTS 6,085,333 A   7/2000  DeKoning et al.
6,393,605 B1  5/2002  Loomans
(Continued)

FOREIGN PATENT DOCUMENTS

WO   2014124243 A2   8/2014

OTHER PUBLICATIONS

Doukas, Building internet of things with the arduino, retrieved from archive.org, 14 pages.

(Continued)

*Primary Examiner* — Brittany N Allen
(74) *Attorney, Agent, or Firm* — Master Key IP, LLP; Justin G. Sanders

(57) ABSTRACT

Unified management, automation, interoperability, and synchronization of virtual and physical device systems utilizing components of a no-code, event-driven edge computing platform on any device and/or across difference devices. In an embodiment, a system on a device accesses a first events dataset which represents a two-dimensional structure. Each row in the events dataset is processed by the system to create or update the state of a runtime dataset which represents a two-dimensional structure. The state of the runtime dataset comprises an instance of an event-defined system including event-defined processes. In an embodiment, the event-defined processes are executed by the system to process a second events dataset, wherein the execution of the event-defined processes further updates the state of the runtime dataset and may create one or more new events for processing.

9 Claims, 40 Drawing Sheets

Related U.S. Application Data continuation-in-part of application No. 15/466,572, filed on Mar. 22, 2017, now abandoned, which is a continuation-in-part of application No. 15/290,964, filed on Oct. 11, 2016, now Pat. No. 10,545,933, which is a continuation of application No. 14/685,545, filed on Apr. 13, 2015, now Pat. No. 9,495,401.

(60) Provisional application No. 62/130,330, filed on Mar. 9, 2015, provisional application No. 62/008,311, filed on Jun. 5, 2014, provisional application No. 61/978,440, filed on Apr. 11, 2014.

(51) Int. Cl.
| | | |
|---|---|---|
| *G06F 16/17* | (2019.01) | |
| *G06F 16/22* | (2019.01) | |
| *G06F 16/23* | (2019.01) | |
| *G06F 16/2455* | (2019.01) | |
| *G06F 16/25* | (2019.01) | |
| *G06F 16/28* | (2019.01) | |

(52) U.S. Cl.
CPC ...... *G06F 16/2272* (2019.01); *G06F 16/2379* (2019.01); *G06F 16/24568* (2019.01); *G06F 16/25* (2019.01); *G06F 16/289* (2019.01)

(58) Field of Classification Search
CPC ... G06F 16/24568; G06F 16/25; G06F 16/289
See application file for complete search history.

(56) References Cited

U.S. PATENT DOCUMENTS

| | | |
|---|---|---|
| 6,981,097 B2 | 12/2005 | Martin et al. |
| 7,321,849 B2 | 1/2008 | Brumitt et al. |
| 7,321,894 B2 | 1/2008 | Degtyar et al. |
| 8,572,057 B2 | 10/2013 | Jasik et al. |
| 11,042,556 B2 | 6/2021 | Griffith et al. |
| 2005/0160060 A1 | 7/2005 | Swartz et al. |
| 2006/0143193 A1 | 6/2006 | Thakkar et al. |
| 2006/0143238 A1 | 6/2006 | Tamatsu |
| 2007/0143379 A1 | 6/2007 | i Dalfo et al. |
| 2007/0198656 A1 | 8/2007 | Mazzaferri et al. |
| 2007/0283317 A1 | 12/2007 | Sadler et al. |
| 2008/0183726 A1 | 7/2008 | Bruckner et al. |
| 2009/0204629 A1 | 8/2009 | Barrow |
| 2010/0057485 A1 | 3/2010 | Luft |
| 2011/0200052 A1 | 8/2011 | Mungo et al. |
| 2011/0258461 A1 | 10/2011 | Bates |
| 2011/0302573 A1 | 12/2011 | Bubolz et al. |
| 2012/0079221 A1 | 3/2012 | Sivasubramanian et al. |
| 2012/0209762 A1 | 8/2012 | Metaireau et al. |
| 2012/0323848 A1 | 12/2012 | Hildebrand et al. |
| 2013/0094444 A1 | 4/2013 | Lai et al. |
| 2013/0179557 A1 | 7/2013 | Bian et al. |
| 2013/0188515 A1 | 7/2013 | Pinheiro et al. |
| 2013/0232255 A1 | 9/2013 | Fukui et al. |
| 2013/0265937 A1 | 10/2013 | Jain et al. |
| 2013/0324121 A1 | 12/2013 | Kwon et al. |
| 2014/0036728 A1 | 2/2014 | An et al. |
| 2014/0074887 A1 | 3/2014 | Neels et al. |
| 2014/0100912 A1 | 4/2014 | Bursey |
| 2014/0181085 A1 | 6/2014 | Gokhale et al. |
| 2014/0258363 A1 | 9/2014 | Peco et al. |
| 2014/0324973 A1 | 10/2014 | Goel et al. |
| 2016/0006815 A1 | 1/2016 | Dong et al. |
| 2018/0075107 A1 | 3/2018 | Park et al. |

OTHER PUBLICATIONS

Pfister, Getting started with the internet of things, May 2011, 39 pages.

International Search Report and Written Opinion received in PCT/US2015/025622, mailed Jul. 16, 2015.

Han et al., Situational data integration with data services and nested table, SOCA 2013 (Year: 2013).

Koster, Data Models for the Internet of Things, May 2013 (Year: 2013).

International Search Report and Written Opinion, PCT/US2014/015284, mailed Nov. 27, 2014.

FIG. 12

COMMUNICATOR 210

```
if (Runtime === undefined) {
  Runtime=[];
  Runtime.push(Array(14));
  Runtime[0][0]="C823...";
  Runtime[0][1]="483A...";
  Runtime[0][2]="D6C2...";
  Runtime[0][3]="67AD...";
  Runtime[0][4]="7123...";
  Runtime[0][5]="8DE3...";
  Runtime[0][6]="236E...";
  Runtime[0][7]="FC4E...";
  Runtime[0][8]="C35D...";
  Runtime[0][9]="C812...";
  Runtime[0][10]="B759...";
  Runtime[0][11]="C028...";
  Runtime[0][12]="85FE...";
  Runtime[0][13]="38A5...";
  sessionRI=1;
  Runtime[sessionRI][0]=newUUID();
  Runtime[sessionRI][1]="38D2...";
}
for (RI = 0; RI < Events.length; RI++) {
  Runtime[sessionRI][2]=Events[RI][1];
  Runtime[sessionRI][3]=Events[RI][2];
  Runtime[sessionRI][4]=Events[RI][3];
  Runtime[sessionRI][5]=Events[RI][4];
  Runtime[sessionRI][6]=Events[RI][5];
  Runtime[sessionRI][7]=Events[RI][6];
  Runtime[sessionRI][8]="B884...";
  EXEC();
}
```

EP 281

EXEC 281A

```
switch(Runtime[sessionRI][8]) {
  case "1A31...":
    FIND(); break;
  case "8EB2...":
    GET(); break;
  case "B4DA...":
    SET(); break;
  case "C458...": //Process
    for (RI = 0; RI < Instruct.length; RI++) {
      Runtime[sessionRI][8]= Instruct[RI][0];
      Runtime[sessionRI][9]= Instruct[RI][1];
      Runtime[sessionRI][10]= Instruct[RI][2];
      EXEC();
    } break;
  case "B884...": // Event
    SET();
    Runtime[sessionRI][13] ="E549...";
    Runtime[sessionRI][8] ="C458...";
    EXEC(); break;
}
```

FIND 281B

```
classID = Runtime[sessionRI][4];
attributeID = Runtime[sessionRI][6];
value = Runtime[sessionRI][7];
CI = Runtime[0].indexOf(attributeID);
for (RI = 0; RI < Runtime.length; RI++) {
  if (Runtime[RI][1]==classID &&
      Runtime[RI][CI]==value){
    Runtime[sessionRI][12].push(RI);
  }
}
```

GET 281C

```
attributeID = Runtime[sessionRI][6];
nestedRI = Runtime[sessionRI][11];
RI = Runtime[sessionRI][12];
dataset=Runtime;
if(nestedRI.length>0) {
  dataset = Runtime[nestedRI][nestedCI];
}
CI = dataset[0].indexOf(attributeID);
Runtime[sessionRI][7] = dataset[RI][CI];
```

SET 281D

```
attributeID = Runtime[sessionRI][6];
nestedRI = Runtime[sessionRI][11];
RI = Runtime[sessionRI][12];
dataset=Runtime;
if(nestedRI.length>0) {
  dataset = Runtime[nestedRI][nestedCI];
}
CI = dataset[0].indexOf(attributeID);
if (CI == -1) {
  CI=columns.length;
  dataset[0][CI] = attributeID;
  if (attributeID=="7B6A..."){nestedCI=CI;}
}
if (RI == dataset.length) {
  dataset.push(Array(columns.length));
}
dataset[RI][CI] = Runtime[sessionRI][7];
```

Attribute Representation

| | 0381.../ Object |
|---|---|
| | C823.../ Identifier [Identifier] |
| | 483A.../ Class [Relation] |
| | 5584.../ Owning Party [Relation] |
| | 6842.../ Name |
| | A4F2.../ Term [Relation] |
| | 48F3.../ Status [Inactive/Active] |

Runtime Dataset 282

| RI/CI | 0 | 1 | 16 | 18 | 19 |
|---|---|---|---|---|---|
| 0 | C823... (Identifier) | 483A... (Class) | A4F2... (Term) | 1001... (Data Type) | 54C9... (Related Class) |
| 9 | C823... | 0CC1... (Identifier) | 096C... (Identifier) | 7D17... (Text) | |
| 10 | 483A... | 1C5A... (Relation) | 3331... (Class) | 7D17... | 8F55... (Class) |
| 11 | 5584... | 1C5A... (Relation) | C4E2... (Owner Party) | 7D17... | CDBD... (Party) |
| 12 | 6842... | 066D... (Attribute) | FBE0... (Name) | 7D17... | |
| 13 | A4F2... | 1C5A... (Relation) | E0F3... (Term) | 7D17... | 6C7A... (Term) |
| 14 | 48F3... | 066D... (Attribute) | BB02... (Status) | 66B1... (Inactive/Active) | |

FIG. 15

Enumerator Representation

| 4C7D.../ Instruction |
|---|
| 411E.../ Function [Enumeration] |
| • 977F.../ Find |
| • 8EB2.../ Get |
| • B4DA.../ Set |
| • 22A1.../ Transfer |
| • 6549.../ UUID |
| • B884.../ Event |
| • C458.../ Process |
| • 8CCE.../ Send message |
| • 977F.../ Add |
| • 13F2.../ Subtract |
| • 73B6.../ Multiply |
| • CCB7.../ Divide |
| • 7B6C.../ Increment |
| • 50C3.../ Decrement |
| • D0B0.../ Prefix |
| • 2691.../ Suffix |
| • C462.../ Slice |
| • 5708.../ Splice |
| • C505.../ Split |
| • D2B0.../ Push |
| • 74FF.../ Substring |
| • EFE1.../ Serialize |
| • 4D01.../ Parse |
| • ... |

Runtime Dataset 282

| RI/CI | 0 | 1 | 16 | 20 |
|---|---|---|---|---|
| 0 | C823... (Identifier) | 483A... (Class) | A4F2... (Term) | 2CAD... (Enumeration) |
| 15 | 977F... | 8178... (Enumerator) | CC43... (Find) | 411E... (Function) |
| 16 | 8EB2... | 8178... | 7840... (Get) | 411E... |
| 17 | B4DA... | 8178... | 5136... (Set) | 411E... |
| 18 | 22A1... | 8178... | 707A... (Transfer) | 411E... |
| 19 | B884... | 8178... | B135... (Event) | 411E... |
| ... | | | | ... |

FIG. 16

Data Type Representation

| RI/CI | 0 | 1 | 16 | Runtime Dataset 282 | | | |
|---|---|---|---|---|---|---|---|
| | | | | 102 | 103 | 104 | 105 |
| 0 | C823... (Identifier) | 483A... (Class) | A4F2... (Term) | AC8C... (Base Unit) | D47D... (Quantity) | DA68... (Multiplier) | AE93... (Offset) |
| 130 | 2D49... | 024B... (Quantity) | 2388... (Length) | 1826... (Meter) | | | |
| 131 | 1826... | CAC4... (Unit) | 27B4... (Meter) | | 2D49... (Length) | 1 | 0 |
| 132 | B8A7... | CAC4... | 4520... (Inch) | | 2D49... | 0.0254 | 0 |
| 133 | 6417... | CAC4... | A197... (Pixel) | | 2D49... | 0.000127 | 0 |

FIG. 17

National Language Representation

Runtime Dataset 282

| R/Cl | 0 | 1 | 16 | 34 | 35 |
|---|---|---|---|---|---|
| 0 | C823... (Identifier) | 483A... (Class) | A4F2... (Term) | 7E86... (English) | 3CCD... (Spanish) |
| 10 | 483A... | 1C5A... (Relation) | 3331... (Class) | | |
| 20 | 995C... | 6C7A... (Term) | | English | Inglés |
| 21 | 6EAD... | 6C7A... | | Spanish | Español |
| 22 | 3331... | 6C7A... | | Class,Classes | Clase,Clases |
| 23 | FBE0... | 6C7A... | | Name | Nombre |
| 24 | F7D7... | 6C7A... | | Quantity | Cantidad |

FIG. 18

Modeling System Representation

| RI/CI | 0 | 1 | 15 | 21 | 22 | 23 | 24 | 25 | 26 |
|---|---|---|---|---|---|---|---|---|---|
| 0 | C823... (Identifier) | 483A... (Class) | 6842... (Name) | 61E9... (System) | 423C... (Class) | 3492... (Attribute) | 0285... (Data Type) | AC8C... (Base Unit) | CB3F... (Alt Identifier) |
| 25 | 834D... | F3D7... (System) | Modeling | | | | | | |
| 26 | D086... | 8D55... (System Class) | | 68DA... (Modeling) | F915... (View Element) | | | | |
| 27 | 834D... | 8D55... | | 68DA... | F3D7... (System) | | | | |
| 28 | 8282... | 8D55... | | 68DA... | AD33... (Process) | | | | |
| 29 | 33A0... | 8D55... | | 68DA... | 5D39... (Rule) | | | | |
| 30 | C1B0... | 1505... (System Data Type) | | | | | 2D49... (Length) | B8A7... (Inch) | |

Runtime Dataset 282

FIG. 19

| RI/CI | 0 | 1 | 15 | 36 | 37 | 38 | 39 |
|---|---|---|---|---|---|---|---|
| | | | | Runtime Dataset 282 | | | |
| 0 | C823... (Identifier) | 483A... (Class) | 6842... (Name) | FB08... (System) | 5237... (Parent Process) | C06F... (Base Class) | 6498... (Query) |
| 31 | BEFE... | F3D7... (System) | Framework | | | | |
| 32 | 2369... | AD33... (Process) | Process Event | BEFE... (Framework) | | 38D2 (Session) | |
| 33 | A0EF... | AD33... | Process Triggers | BEFE... | | EC86... (Trigger) | |
| 34 | E549... | AD33... | Run Process | BEFE... | | AD33... [Process] | |
| 35 | 9A67... | AD33... | Run Query | BEFE... | E549... (Run Process) | 3F5E... (Process Instance) | |
| 36 | E507... | AD33... | Process Query Classes | BEFE... | 9A67... (Run Query) | 6F62... (Process Class) | |
| 37 | 6AA6... | AD33... | Build Nested Dataset | BEFE... | E507... (Process Query Classes) | 8ECC... (Process Attribute) | |
| 38 | 7A7E... | AD33... | Run Instructions | BEFE... | E549... (Run Process) | | 3AD4... (Rule) |
| 39 | 4AAD... | AD33... | Run Subprocesses | BEFE... | E549... | AD33... [Process] | |
| 40 | B405... | AD33... | Render View | BEFE... | E549... | ADEB... (View) | |
| 41 | 70C3... | AD33... | Render View Elements | BEFE... | B405... (Render View) | F915... (View Element) | |
| 42 | D9D5... | AD33... | Set Element Attributes | BEFE... | 70C3... (Render View Elements) | 066D... (Attribute) | |

FIG. 21

| RI/CI | 0 | 1 | 15 | 40 | 41 | 42 | 43 |
|---|---|---|---|---|---|---|---|
| 0 | C823... (Identifier) | 483A... (Class) | 6842... (Name) | AD9E... (Process) | 2E64... (Attribute) | E552... (Process Class) | FB53... (Sortation) |
| 43 | 82AB... | 8ECC... (Process Attribute) | Connection | E549... (Run Process) | D6C2... (Source Connection) | | |
| 44 | 281D... | 8ECC... | System | E549... | 67AD... (System) | | |
| 45 | B8D0... | 8ECC... | Class | E549... | 7123... (Class) | | |
| 46 | 8110... | 8ECC... | Object | E549... | 8DE3... (Object) | | |
| 47 | 92B8... | 8ECC... | Attribute | E549... | 236E... (Attribute) | | |
| 48 | 28C8... | 8ECC... | Value | E549... | FC4E... (Value) | | |

Runtime Dataset 282

FIG. 22

| RI/CI | 1 | 40 | 44 | 45 | 48 |
|---|---|---|---|---|---|
| 0 | 483A... (Class) | AD9E... (Process) | 653F... (Class) | 1571... (Attribute) | 411E... (Function) |
| 49 | 7A7E... (Instruction) | E549... (Run Process) | | | C823... (UUID) |
| 50 | 7A7E... | E549... | | 8DE3... (Object) | 22A1... (Transfer) |
| 51 | 7A7E... | E549... | | 38A5... (Process) | 8EB2... (Get) |
| 52 | 7A7E... | E549... | 3F5E... (Process Instance) | AD9E... (Process) | B884... (Event) |
| 53 | 7A7E... | E549... | | 8DE3... (Object) | 8EB2... (Get) |
| 54 | 7A7E... | E549... | 38D2... (Session) | 409F... (Process Instance) | B884... (Event) |

Runtime Dataset 282

FIG. 23

Display System Representation

| RI/CI | 0 | 1 | 15 | 21 | 22 | 23 | 24 | 25 | 26 |
|---|---|---|---|---|---|---|---|---|---|
| 0 | C823... (Identifier) | 483A... (Class) | 6842... (Name) | 61E9... (System) | 423C... (Class) | 3492... (Attribute) | 0285... (Data Type) | AC8C... (Base Unit) | CB3F... (Alt Identifier) |
| 56 | F5E0... | F3D7... (System) | Display | | | | | | |
| 57 | 0D32... | 8D55... (System Class) | | F5E0... (Display) | F915... (View Element) | | | | DIV |
| 58 | F34B... | 8D55... | | F5E0... | 1EBC... (Text) | | | | SPAN |
| 59 | 0D32... | 8D55... | | F5E0... | 41C9... (Barcode) | | | | BARCODE |
| 60 | DCCB... | A4A9... (System Attribute) | | F5E0... | | 4776... (Top Position) | | | Top |
| 61 | 3390... | A4A9... | | F5E0... | | 65CD... (Left Position) | | | Left |
| 62 | 68B4... | A4A9... | | F5E0... | | BD06... (Height) | | | height |
| 63 | E7BE... | A4A9... | | F5E0... | | 2415... (Width) | | | width |
| 64 | B65D... | A4A9... | | F5E0... | | 8A6D... (Content) | | | value |
| 65 | B860... | 1505... (System Data Type) | | F5E0... | | | 2D49... (Length) | 6417... (Pixel) | px |

Runtime Dataset 282

FIG. 24

Commerce System Representation

Runtime Dataset 282

| RI/CI | 0 | 1 | 15 | 36 | 38 | 50 | 51 |
|---|---|---|---|---|---|---|---|
| 0 | C823... (Identifier) | 483A... (Class) | 6842... (Name) | FB08... (System) | C06F... (Base Class) | 6820... (Role) | C373... (Instruction Sequence) |
| 67 | 93E0... | F3D7... (System) | Commerce | | | | |
| 68 | C9EB... | AD33... (Process) | Decrement Inventory | 93E0... (Commerce) | 7F69... (Trade Item) | | DE33...,BF17...,EE06...,7153..., E228...,8EA3...,9128... |
| 69 | 9A85... | ADEB... (View) | Shipping Label | 93E0... | C6A0... (Ship Container) | | |
| 70 | 278C... | ADEB... | Address | 93E0... | 0424... (Location) | A4BA... (GUI) | |
| 71 | 3BA7... | ADEB... | Shipment Items | 93E0... | 44F0... (Shipment Item) | | |
| 180 | 614A... | AD33... (Process) | Post Shipment | 93E0... | 38A3... (Shipment) | | |

FIG. 25

| RI/CI | 0 | 1 | 15 | 40 | 52 | 53 | 54 |
|---|---|---|---|---|---|---|---|
| 0 | C823... (Identifier) | 483A... (Class) | 6842... (Name) | AD9E... (Process) | 4DCE... (Class) | 1DF7... (Base Class) | A47A... (Relation) |
| 72 | 85E7... | 6F62... (Process Class) | Inventory | C9EB... (Decrement Inv.) | 5787... (Inventory) | | A99C... (Inventory) |
| 73 | 9C05... | 6F62... | Shipment | 9A85... (Shipping Label) | 38A3... (Shipment) | | 4002... (Shipment) |
| 74 | 98E1... | 6F62... | Ship From | 9A85... | 0424... (Location) | 9C05... (Shipment) | 3CE3... (Origination) |
| 75 | 16DB... | 6F62... | Ship To | 9A85... | 0424... (Location) | 9C05... (Shipment) | CF20... (Destination) |
| 75 | D8BD... | 6F62... | City | 278C... (Address) | Location | | C329... (Within Location) |
| 76 | 1BFA... | 6F62... | State | 278C... | Location | D8BD... (City) | C329... |

Runtime Dataset 282

FIG. 26

Runtime Dataset 282

| RI/CI | 0 | 1 | 15 | 40 | 41 | 42 | 43 |
|---|---|---|---|---|---|---|---|
| 0 | C823... (Identifier) | 483A... (Class) | 6842... (Name) | AD9E... (Process) | 2E64... (Attribute) | E552... (Process Class) | FB53... (Sortation) |
| 77 | 0725... | 8ECC... (Process Attribute) | Inventory UUID | C9EB... (Decrement Inv.) | C823... (UUID) | 85E7... (Inventory) | |
| 78 | 5753... | 8ECC... | Inventory Qty | C9EB... | C88D... (Quantity) | 85E7... | |
| 79 | 0C1E... | 8ECC... | Trade Qty | C9EB... | F827... (Quantity) | | |
| 80 | 7794... | 8ECC... | Sender | 9A85... (Shipping Label) | 488E... (Sender) | | |
| 81 | F945... | 8ECC... | Recipient | 9A85... | 6BC7... (Recipient) | | |
| 82 | 75AD... | 8ECC... | Name | 278C... (Address) | 6842... (Name) | | |
| 83 | 498A... | 8ECC... | City | 278C... | 6842... | D8BD... (City) | |
| 84 | 63A5... | 8ECC... | State | 278C... | 6842... | 1BFA... (State) | |
| 85 | A25E... | 8ECC... | Postal Code | 278C... | 57C5... (Postal Code) | | |
| 86 | 4D2D... | 8ECC... | Name | 3BA7... (Shipment Items) | 6842... (Name) | | 1A9A... (Ascending) |
| 87 | 8425... | 8ECC... | Quantity | 3BA7... | F827... (Quantity) | | |

FIG. 27

| RI/CI | 0 | 1 | 40 | 44 | 45 | 46 | 47 | 48 | 49 |
|---|---|---|---|---|---|---|---|---|---|
| 0 | C823... (Identifier) | 483A... (Class) | AD9E... (Process) | 653F... (Class) | 1571... (Attribute) | 99DB... (Operator) | AEBB... (Object) | 411E... (Function) | CEBF... (Process Attribute) |
| 88 | 803E... | EC86... (Trigger) | C9EB... (Decrement Inv.) | 38A3... (Shipment) | 8087... (Status) | A5F0... (equals) | AD5B... (Packed) | | |
| 89 | AD5B... | EC86... | 9A85... (Shipping Label) | 38A3... | 8087... | A5F0... | 803E... | | |
| 90 | DE33... | 7A7E... (Instruction) | C9EB... (Decrement Inv.) | | | | | 8EB2... (Get) | 0725... (Inventory UUID) |
| 91 | BF17... | 7A7E... | C9EB... | | B759... (Param 2) | | | 22A1... (Transfer) | |
| 92 | EE06... | 7A7E... | C9EB... | | | | | 8EB2... (Get) | 0C1E... (Trade Qty) |
| 93 | 7153... | 7A7E... | C9EB... | | C812... (Param 1) | | | 22A1... (Transfer) | |
| 94 | E228... | 7A7E... | C9EB... | | | | | 8EB2... (Get) | 5753... (Inventory Qty) |
| 95 | 8EA3... | 7A7E... | C9EB... | | | | | 13F2... (Subtract) | |
| 96 | 9128... | 7A7E... | C9EB... | 5787... (Inventory) | C88D... (Quantity) | | | B884... (Event) | |

Runtime Dataset 282

FIG. 28

| | | | Runtime Dataset 282 | | | | | | |
|---|---|---|---|---|---|---|---|---|---|
| RI/CI | 0 | 1 | 55 | 56 | 57 | 58 | 59 | 60 | 61 | 62 |
| 0 | C823... (Identifier) | 483A... (Class) | 1C54... (View) | 8BA3... (Process Attribute) | 4776... (Top) | 65CD... (Left) | BD06... (Height) | 2415... (Width) | 09DD... (Subview) | 3D5E... (Process Class) |
| 97 | 6AE6... | 1EBC... (Text) | 9A85... (Shipping Label) | 7794... (Sender) | 0.05 | 0.1 | 0.1 | 1.5 | | |
| 98 | 14E3... | 1EBC... (Text) | 9A85... | F945... (Recipient) | 0.85 | 0.3 | 0.2 | 3 | | |
| 99 | BDBB... | 55BC... (Subview) | 9A85... | | 0.2 | 0.1 | 0.5 | 1.5 | 278C... (Address) | 98E1... (Ship From) |
| 100 | 60BC... | 55BC... | 9A85... | | 1.0 | 0.3 | 1.2 | 3.5 | 278C... | 16DB... (Ship To) |
| 101 | F65D... | 55BC... | 9A85... | | 3.5 | 0 | 2.5 | 4 | 3BA7... (Shipment Items) | |
| 102 | B3EA... | 1EBC... (Text) | 278C... (Address) | 75AD... (Name) | 0 | 0 | 0.2 | 3 | | |
| 103 | 615C... | 1EBC... | 278C... | 498A... (City) | 0.2 | 0 | 0.2 | 2 | | |
| 104 | 9F48... | 1EBC... | 278C... | 63A5... (State) | 0.2 | 1 | 0.2 | 0.5 | | |
| 105 | 72DD... | 1EBC... | 278C... | A25E... (Postal Code) | 0.2 | 1.5 | 0.2 | 0.5 | | |
| 106 | 4A0E... | 1EBC... | 3BA7... (Shipment Items) | 4D2D... (Name) | 0 | .5 | 0.2 | 3 | | |
| 107 | CB01... | 1EBC... | 3BA7... | 8425... (Quantity) | 0 | 3.5 | 0.2 | .5 | | |

FIG. 29

Legacy System Representation

Runtime Dataset 282

| RI/CI | 0 | 1 | 15 | 21 | 22 | 23 | 26 | 63 |
|---|---|---|---|---|---|---|---|---|
| 0 | C823... (Identifier) | 483A... (Class) | 6842... (Name) | 61E9... (System) | 423C... (Class) | 3492... (Attribute) | CB3F... (Alt Identifier) | 303C... (Parent System) |
| 110 | E375... | F3D7... (System) | Shipping | | | | | 93E0... (Commerce) |
| 111 | C034... | 8D55... (System Class) | | E375... (Shipping) | 38A3... (Shipment) | | shipments | |
| 112 | 92E3... | A4A9... (System Attribute) | | E375... | | CF20... (Ship To) | shipTo | |
| 113 | 8AEE... | A4A9... | | E375... | | 4FDC... (Transport Service) | serviceCode | |
| 114 | 4382... | A4A9... | | E375... | | 5406... (Weight) | weight | |
| 115 | 0224... | A4A9... | | E375... | | 7223... (Service Fee) | shipmentCost | |

Runtime Dataset 282

| RI/CI | 0 | 1 | 15 | 36 | 37 | 38 |
|---|---|---|---|---|---|---|
| 0 | C823... (Identifier) | 483A... (Class) | 6842... (Name) | FB08... (System) | 5237... (Parent Process) | C06F... (Base Class) |
| 116 | C9EB... | AD33... (Process) | Post_ship | E375... (Shipping) | 614A... (Post Shipment) | 38A3... (Shipment) |

FIG. 30

Microcontroller System Representation

| RI/CI | 0 | 1 | 15 | 21 | 22 | 23 | 26 | 100 |
|---|---|---|---|---|---|---|---|---|
| 0 | C823... (Identifier) | 483A... (Class) | 6842... (Name) | 61E9... (System) | 423C... (Class) | 3492... (Attribute) | CB3F... (Alt Identifier) | 41FB... (Enum...) |
| 118 | E377... | F3D7... (System) | Printer Control | | | | | |
| 119 | 8421... | 8D55... (System Class) | | E377... (Printer Control) | F130... (Printer) | | | |
| 120 | 9938... | A4A9... (System Attribute) | | E377... | | 8D58... (Power) | Pin 1 | |
| 121 | EE83... | A4A9... | | E377... | | D9C4... (Status) | Pin 2 | |
| 122 | 02A3... | C659... (System Enumerator) | | E377... | | | 1 | 7D62... (Ready) |
| 123 | 28DE... | C659... | | E377... | | | 2 | 36AB... (Printing) |
| 124 | 2892... | C659... | | E377... | | | 3 | 196F... (Paused) |

Runtime Dataset 282

FIG. 31

Runtime Dataset 282

| R/Cl | 0 | 1 | 14 | 15 | 27 | 28 | 29 | 30 | 31 | 32 | 33 |
|---|---|---|---|---|---|---|---|---|---|---|---|
| 0 | C823... (Identifier) | 483A... (Class) | 5584... (Owner) | 6842... (Name) | B183... (Device) | AACE... (System) | E5E4... (Party) | 8C87... (Connected Device) | 17B5... (Connected System) | A24C... (Role) | 889B... (Address) |
| 2 | 064C... | F39A... (Connection) | 0914... (Zebra) | Framework | | FA49... (Phone Control) | | | BEFE... (Framework) | | ...271 |
| 55 | 8021... | F39A... | 0914... | Display | 3631... | FA49... | | | F5E0... (Display) | A4BA... (GUI) | ...882 |
| 66 | A343... | F39A... | 0914... | Worker 1 | 3631... | 93E0... (Commerce) | AFD8... (JSmith) | | | 35F6... (Worker) | ...128 |
| 108 | BB80... | F39A... | 0914... | ADCTech | | 93E0... | BC8C... (ADCTech) | | | 77D9... (Customer) | ...589 |
| 109 | 828C... | F39A... | 0914... | Carrier 1 | | 93E0... | F737... (UPS) | | | AF8A... (Carrier) | ...721 |
| 117 | 9928... | F39A... | 0914... | Printer 1 | | 93E0... | | 3A79... (Device 3) | E377... (Printer Control) | F130... (Printer) | ...192 |

Runtime Dataset 282

| R/Cl | 0 | 1 | 14 | 15 | 93 |
|---|---|---|---|---|---|
| 0 | C823... (Identifier) | 483A... (Class) | 5584... (Owner) | 6842... (Name) | 65B6... (Role) |
| 140 | E02B... | 4D7A... (Device) | 0914... (Zebra) | QL420 Printer | F130... (Printer) |

Runtime Dataset 282

| R/Cl | 0 | 1 | 14 | 15 | 78 | 94 | 95 | 96 | 97 | 98 | 99 |
|---|---|---|---|---|---|---|---|---|---|---|---|
| 0 | C823... (Identifier) | 483A... (Class) | 5584... (Owner) | 6842... (Name) | E498... (Product) | 8D58... (Power) | AC2C... (Language) | 0BE4... (System) | D9C4... (Status) | F43A... (Speed) | C087... (Head Temp.) |
| 141 | 3A79... | 2849... (Equipment) | 0914... | Device 3 | E02B... (QL420) | 1 (On) | 7E86... (English) | E377... (Printer Control) | 7D62... (Ready) | 6 | 95 |

FIG. 32

Runtime Dataset 282

| RI/CI | 0 | 1 | 15 | 67 | 68 |
|---|---|---|---|---|---|
| 0 | C823... (Identifier) | 483A... (Class) | 6842... (Name) | C329... (Within Location) | 57C5... (Postal Code) |
| 142 | 409E... | 0424... | CA | 409E... (CA) | |
| 143 | 2EA4... | 0424... | San Clemente | 409E... | |
| 144 | F6AD... | 0424... | Ontario | | |
| 145 | 632C... | 0424... (Location) | 2900 Calle Heraldo | 2EA4... (San Clemente) | 92673 |
| 146 | 9241... | 0424... | 3100 East Cedar St | F6AD... (Ontario) | 91761 |

Runtime Dataset 282

| RI/CI | 0 | 1 | 14 | 15 | 77 | 78 | 79 |
|---|---|---|---|---|---|---|---|
| 0 | C823... (Identifier) | 483A... (Class) | 5584... (Owner) | 6842... (Name) | 0F60... (Location) | E498... (Product) | C88D... (Quantity) |
| 147 | AD2D... | 5787... (Inventory) | 0914... (Zebra) | Printer 1 | 632C... (2900 Calle...) | 5A33... | 1 |
| 148 | 0213... | 5787... | 0914... | Computer 1 | 632C... | 23C4... | 1 |

Runtime Dataset 282

| RI/CI | 0 | 1 | 14 | 15 | 64 | 65 | 66 | 69 | 70 | 71 |
|---|---|---|---|---|---|---|---|---|---|---|
| 0 | C823... (Identifier) | 483A... (Class) | 5584... (Owner) | 6842... (Name) | 8087... (Status) | 3CE3... (From Location) | CF20... (To Location) | BE3A... (Carrier) | DB46... (Service) | 7223... (Service Fee) |
| 149 | 317A... | 38A3... (Shipment) | 0914... (Zebra) | Shipment 1 | AD5B... (Packed) | 632C... (2900 Calle...) | 9241... (3100 East...) | (UPS) | 7A06... (Ground) | |

Runtime Dataset 282

| RI/CI | 0 | 1 | 14 | 15 | 72 | 73 | 74 | 75 | 76 |
|---|---|---|---|---|---|---|---|---|---|
| 0 | C823... (Identifier) | 483A... (Class) | 5584... (Owner) | 6842... (Name) | 065C... (Shipment) | 5E23... (Container) | A033... (Product) | F827... (Quantity) | A99C... (Inventory) |
| 150 | 8DC9... | C6A0... (Shipment Container) | 0914... | Container 1 | 317A... (Shipment 1) | | | | |
| 151 | 3BE2... | 44F0... (Shipment Item) | 0914... | QL420 Printer | 317A... | 8DC9... (Container 1) | 5A33... | 1 | 28GG... (Printer 1) |
| 152 | A094... | 44F0... | 0914... | TC50 Computer | 317A... | 8DC9... | 23C4... | 1 | 0213... |

FIG. 33

Runtime Dataset 282

| RI/CI | 0 | 1 | 82 | 83 | 84 | 85 | 86 | 87 | 88 | 89 | 90 | 91 |
|---|---|---|---|---|---|---|---|---|---|---|---|---|
| 0 | C823... (Identifier) | 483A... (Class) | AD93... (Process) | 46F4... (Session) | BAAB... (Parent Instance) | 189F... (Object) | 845B... (Class) | F0E6... (Child Attribute) | 4CDC... (Parent Object) | 189F... (Objects) | 7B6A... (Dataset) | 8058... (Dataset Row) |
| 154 | 9299... | 3F5E... (Process Instance) | E549... (Run Process) | 28DB... (Session 2) | | | | | | 153 | Nested Dataset 1 | 1 |
| 155 | 28AA... | 3F5E... | C9EB... (Decrement Inv.) | 28DB... | 9299... | D384... (Shipment 1) | 38A3... (Shipment) | 4002... (Shipment) | D384... (Shipment 1) | 147,148 | Nested Dataset 2 | 2 |
| 156 | B833... | 3F5E... | 9A85... (Shipping Label) | 28DB... | 9299... | D384... | 38A3... | 065C... (Shipment) | D384... | 150 | Nested Dataset 3 | 1 |
| 157 | G3F8... | 3F5E... | 278C... (Address) | 28DB... | B833... | D384... | 38A3... | | | 149 | Nested Dataset 4 | 1 |
| 158 | 8A82... | 3F5E... | AD33... (Process Query Classes) | 28DB... | G3F8... | | | | | 75,76 | Nested Dataset 5 | 2 |
| 159 | 932A... | 3F5E... | AD33... (Build Nested Dataset) | 28DB... | 8A82... | | | | | 82,83,84, 85 | Nested Dataset 6 | 4 |
| 160 | 83E3... | 3F5E... | 278C... (Address) | 28DB... | B833... | D384... | 38A3... | | | 149 | Nested Dataset 7 | 1 |
| 161 | 9015... | 3F5E... | 3BA7... (Shipment Items) | 28DB... | B833... | D384... | 38A3... | 4002... (Shipment) | D384... | 151,152 | Nested Dataset 8 | 2 |

Nested Dataset 1

| RI/CI | 0 | 1 | 2 | 3 | 4 | 5 |
|---|---|---|---|---|---|---|
| | 82AB... (Connection) | 281D... (System) | B8D0... (Class) | 8110... (Object) | 92B8... (Attribute) | 28C8... (Value) |
| 0 | A343... (Worker 1) | 93E0... (Commerce) | 38A3... (Shipment) | D384... (Shipment 1) | 8087... (Status) | AD5B... (Packed) |

Nested Dataset 2

| RI/CI | 0 | 1 | 2 |
|---|---|---|---|
| | 0725... (Inventory UUID) | 5753... (Inventory Qty) | 0C1E... (Trade Qty) |
| 0 | AD2D... (Printer 1) | 1 | 1 |
| 1 | | | |
| 2 | 0213... (Computer 1) | 1 | 1 |

FIG. 35

Nested Dataset 5

| RI/CI | 0 | 1 | 2 | 3 | 4 | 5 |
|---|---|---|---|---|---|---|
| 0 | 28A3... (UUID) | 80AD... (Class) | 0A02... (Base Class) | 2822... (Related Attribute) | AE38... (Related Value) | D222... (Related RI) |
| 1 | D8BD... (City) | 0424... (Location) | | C329... (Within Location) | 2EA4... (San Clemente) | 143 |
| 2 | 1BFA... (State) | 0424... | D8BD... (City) | C329... | 409E... (CA) | 142 |

Nested Dataset 6

| RI/CI | 0 | 1 | 2 | 3 | 4 |
|---|---|---|---|---|---|
| 0 | 8383... (UUID) | 993B... (Attribute) | B38A... (Process Class) | 8EC7... (Sortation) | 38D8... (Attribute Value) |
| 1 | 75AD... (Name) | 6842... (Name) | | | 2900 Calle Heraldo |
| 2 | 498A... (City) | 6842... | D8BD... (City) | | San Clemente |
| 3 | 63A5... (State) | 6842... | 1BFA... (State) | | CA |
| 4 | A25E... (Postal Code) | 57C5... (Postal Code) | | | 92673 |

Nested Dataset 4

| RI/CI | 0 | 1 | 2 | 3 |
|---|---|---|---|---|
| 0 | 75AD... (Name) | 498A... (City) | 63A5... (State) | A25E... (Postal Code) |
| 1 | 2900 Calle Heraldo | San Clemente | CA | 92673 |

Runtime Dataset 282

| RI/CI | 0 | 1 | 92 | 101 |
|---|---|---|---|---|
| | C823... (Identifier) | 483A... (Class) | 8A6D... (Content) | 605A... (Parent Element) |
| 162 | 482D... | 1EBC... | 2900 Calle Heraldo | 9201... |
| 163 | 8A83... | 1EBC... | San Clemente | 9201... |
| 164 | D82E... | 1EBC... | CA | 9201... |
| 165 | 72AD... | 1EBC... | 92673 | 9201... |

FIG. 38

```
DISPLAY SYSTEM 280
for (RI = 0; RI < Events.length; RI++) {
    type = Events[RI][3];
    elementID = Events[RI][4];
    attributeID = Events[RI][5];
    value = Events[RI][6];
    element = document.getElementById(elementID);
    if (element == null) {
        element = document.createElement(type);
        element.setAttribute("id", elementID);
    }
    if (attributeID=="parentelement") {
        document.getElementById(Value).appendChild(element);
        continue;
    }
    if (type=="SPAN" && attributeID=="value" && value.length>0) {
        var t = document.createTextNode(value);
        element.appendChild(t);
        continue;
    }
    style = element.getAttribute("style");
    style = style + attributeID + ":" + value + ";";
    element.setAttribute("style", style);
}
```

FIG. 40

NO-CODE, EVENT-DRIVEN EDGE COMPUTING PLATFORM

RELATED APPLICATIONS

This is a continuation-in-part application and so claims the benefit pursuant to 35 U.S.C. § 120 of a prior filed and U.S. non-provisional patent application Ser. No. 16/788,299, filed on Feb. 11, 2020, which itself is a continuation-in-part of U.S. non-provisional patent application Ser. No. 15/466,572, filed on Mar. 22, 2017, which is a continuation-in-part of U.S. non-provisional patent application Ser. No. 15/290,964, filed on Oct. 11, 2016 (now U.S. Pat. No. 10,545,933, issued on Jan. 28, 2020), which is a continuation of U.S. non-provisional patent application Ser. No. 14/685,545, filed on Apr. 13, 2015 (now U.S. Pat. No. 9,495,401, issued on Nov. 15, 2016), which claims priority to each of U.S. provisional application Ser. Nos. 61/978,440, 62/008,311 and 62/130,330, filed on Apr. 11, 2014, Jun. 5, 2014 and Mar. 9, 2015, respectively. The contents of the aforementioned applications are incorporated herein by reference.

This application is also related to U.S. non-provisional patent application Ser. No. 15/091,488, filed on Apr. 5, 2016 (now U.S. Pat. No. 10,223,412, issued on Mar. 5, 2019), which is a continuation of U.S. non-provisional patent application Ser. No. 13/830,249, filed on Mar. 14, 2013 (now U.S. Pat. No. 9,336,013, issued on May 10, 2016), which claims priority to U.S. provisional patent application Ser. Nos. 61/762,779 and 61/783,362, filed on Feb. 8, 2013 and Mar. 14, 2013, respectively. The contents of the aforementioned applications are also incorporated herein by reference.

BACKGROUND

Field of the Invention

The embodiments described herein are generally directed to unified management, automation and interoperability of business and device systems, utilizing a BEAM platform on any device and/or across different devices.

Description of the Related Art

Conventionally, data-centric software applications and application platforms have incorporated one or more software architecture patterns and programming paradigms, including service-oriented, client-server, peer-to-peer, event-driven, and object-oriented architectures, and object-oriented programming, object-relational mapping, and entity-relationship modeling.

Conventionally, device to device and human to device communications are managed through one or more communication protocols (e.g., MQTT, XMPP, DDS, AMQP, CoAP, RESTful HTTP).

None of the existing software architecture patterns or communication protocols have abstraction layers capable of effectively supporting the semantic interoperability requirements of the Internet of Things, Edge Computing and Unified Commerce. This leads to fragmented systems with complex and costly integrations between disparate systems.

It would be beneficial to have an architectural pattern and data exchange schema that eliminates fragmentation and provides normalized layers of abstraction that supports universal, semantic interoperability among devices using a BEAM platform, and enables real-time event-driven process orchestration among devices and business.

SUMMARY

Accordingly, systems and methods are disclosed for unified management, automation and interoperability of business and device processes utilizing a BEAM platform on any device and/or across different devices, aspects of which include, in at least one or more embodiment:

1) Creating, updating, and deleting digital representations of objects while processing an events dataset;
2) Defining digital representations of objects and the relationships between objects as events within an events dataset;
3) Retrieving a current state of digital representations of objects while processing a queries dataset;
4) Retrieving attribute values representing a current state of a digital representation of an object while processing a queries dataset, wherein one of the retrieved attribute values comprises a second queries dataset that can be processed to retrieve a current state of digital representations of objects.
5) Displaying or printing a formatted view of digital representations of objects while processing a view dataset;
6) Transporting a plurality of semantically interoperable events datasets, queries datasets, and/or view datasets among peer devices and among systems within a device;
7) Generating an events dataset, queries dataset, and/or view dataset while processing an application, wherein the application comprises digital representations of objects retrieved while processing a queries dataset;
8) Creating, updating, and deleting digital representations of automation triggers while processing an events dataset, wherein processing an events dataset can trigger the automation defined in the automation triggers;
9) Creating, retrieving, updating, deleting, and transporting semantically interoperable digital representations of attributes of digital representations of objects;
10) Creating, retrieving, updating, deleting, and transporting semantically interoperable digital representations of a plurality of alternate identifiers of a digital representation of an object;
11) Creating, retrieving, updating, deleting, and transporting semantically interoperable digital representations of: businesses and persons; trade relationships between businesses and persons; trade items; trade locations; transactions involving trade relationships, trade items, and trade locations; and automation triggers that automate this trade exchange process; and
12) Creating, retrieving, updating, deleting, and transporting semantically interoperable digital representations of: devices as types of trade items; relationships between devices, businesses, and persons; and automation triggers that automate processes within a device and among related devices.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The details of the present invention, both as to its structure and operation, may be gleaned in part by study of the accompanying drawings. In such drawings:

FIG. 12 illustrates an embodiment of a communicator and event processor components of a BEAM platform, wherein the embodiment is a set of JavaScript functions including an "EXEC", "GET", "FIND", and "SET" function within the event processor;

FIGS. 14-18 illustrate embodiments of a top-level common ontology represented by objects within a Runtime dataset;

FIGS. 19-31 illustrate embodiments of systems, processes, and alternate identifiers represented by objects within a Runtime dataset, including a modeling system, an application framework system, a GUI display system based on W3C's Document Object Model, a commerce system, a carrier shipping system, and a microcontroller system;

FIGS. 32-33 illustrate embodiments of system connections and commerce-related information represented by objects within a Runtime dataset;

FIGS. 34-39 illustrate embodiments of processing by an event processor, in response to a triggering event, to render a view of commerce-related information based on processes and processed objects within a Runtime dataset; and FIG. 40 illustrates an embodiment of a GUI display system as a JavaScript function.

Figure 1:
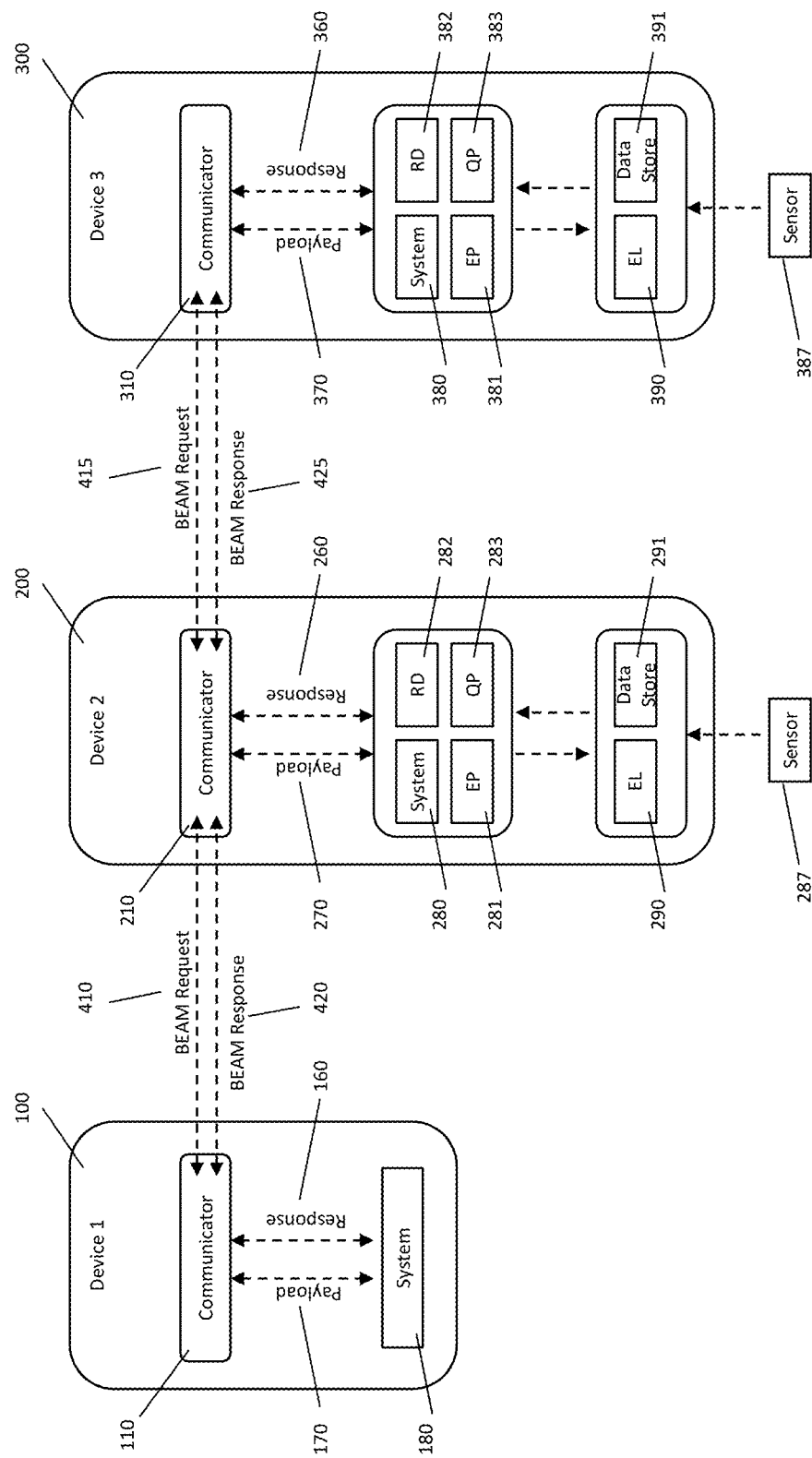
FIG. 1 illustrates a plurality of devices utilizing components of a BEAM platform (i.e., message format, communicator, event processor, runtime dataset, query processor, and event ledger), and interacting with other systems and data stores, including event ledgers, according to at least one embodiment.

The above described drawing figures illustrate aspects of the invention in at least one of its exemplary embodiments, which are further defined in detail in the following description.

Features, elements, and aspects of the invention that are referenced by the same numerals in different figures represent the same, equivalent, or similar features, elements, or aspects, in accordance with one or more embodiments. Furthermore, FIGS. 1-40 incorporate a numbering scheme, wherein a numeral identifies an element being illustrated (e.g., "281" in EP 281 in FIG. 1), and wherein the first digit of the identifying numeral (e.g., "2") represents a particular device (e.g., "Device 2"). A purpose of these figures is to simply illustrate how certain data can be changed and synchronized among devices and systems by transporting and processing data in at least one embodiment. The columns and/or rows within an illustrated dataset may represent only a subset of all the data within the dataset on a device in at least one embodiment.

DETAILED DESCRIPTION

A message format (BEAM), communicator, event processor (EP), runtime dataset (RD), query processor (QP), and event ledger (EL) are disclosed in various embodiments.

1. Glossary

For purposes of understanding the present disclosure, the following terms should be understood to include at least the following, illustrative, non-exhaustive definitions:

"Abstraction Layer": A way of hiding the implementation details of a particular set of functionality, allowing the separation of concerns to facilitate interoperability and platform independence. Software models that use layers of abstraction include the OSI 7-layer model for computer network protocols.

"Aggregate Object": A cluster of associated objects, including a parent object and one or more child objects, that are treated as a unit for the purpose of data changes. An example of an aggregate object is a purchase order object with one or more line item objects related to the purchase order object.

"Application": A system that applies the power of a particular Application Framework to a particular purpose. Examples of applications include, without limitation, machine control, business and/or accounting software, websites, etc.

"Application Framework": A system that forms a software framework to implement the standard structure of an Application. A framework can include standard user interface elements and a rendering format. A framework manages and integrates a device's capabilities, but typically does not directly apply in the performance of tasks that benefit the user or device. An example of an Application Framework includes, without limitation, the Microsoft.NET Framework.

"Attribute": A data characteristic of a class. Every class has a minimal set of uniquely identifying attributes, including a unique identifier.

"Attribute Value": The value of an attribute of an object.

"Authentication": The verification of the credentials of a connection attempt. This process consists of, in at least one embodiment, sending the credentials from one device to another device in an either plaintext or encrypted form by using an authentication protocol.

"Communication Protocol": A system of digital message formats and rules for exchanging messages in or between computing systems (e.g., in telecommunications). Protocols may include signaling, authentication, error detection capabilities, and/or correction capabilities. Each message has an exact meaning intended to provoke a defined response by the receiver. The nature of the communication, the actual data exchanged, and any state-dependent behaviors are defined by a technical specification or communication protocol standard. Examples of conventional communication protocols include, without limitation, HTTP, HTTP Secure (HTTPS), Simple Mail Transfer Protocol (SMTP), Constrained Application Protocol (CoAP), etc.

"Communication System" or "Communicator": A hardware or software component or module that facilitates the exchange of digital messages in or between computing systems. The communication system may also transform a message from one communication protocol to another. Examples of communication systems include, without limitation, a communication bus, a message broker, an event broker, etc.

"Connection": An established agreement or authorization to exchange data between systems.

"Data Store": A repository for persistently storing and managing collections of data. A data store is a general concept that includes not just repositories like databases and event ledgers, but also simpler store types, such as datasets, flat files, firmware, or port pin collections of a microcontroller.

"Dataset": A collection of data represented in tabular form. Each column in a dataset may represent a particular variable. Each row in a dataset may correspond to a given member of the dataset in question. A dataset may comprise data for one or more members, corresponding to the number of rows. Example embodiments of a dataset include a table within a database, a file within a file system, a two-dimensional array, and a port pin collection within a microcontroller.

"Dataset Element": Any value in a dataset. A dataset element can be referenced by a combination of its column position ("column index" or "CI") and row position ("row index" or "RI") within the dataset. Elements within a dataset may be referenced using [x][y] notation, where [x] is the row index and [y] is the column index. A dataset element can represent an attribute value of an object. Examples of a dataset element include a field within a database table, an address within a file, an element within a two-dimensional array, and a port pin within a microcontroller.

"Derived Object": An object of a class derived from attribute values of an originating object of a different class but owned by the same party.

"Duplicated Object": An object of a class derived from attribute values of an originating object of the same class and owned by the same party.

"Class": A category of like things or objects which are each recognized as being capable of an independent existence and which can be uniquely identified. Non-limiting examples of a class include physical objects such as houses or cars, events such as house sales or car services, concepts such as customer transactions or orders, personal information such as contacts, messages, events, and tasks, and object schema including classes, reflectively.

"Event-defined Object": A digital representation of an object that can be compiled from a dataset of events.

"MAC Address": A device address that uniquely identifies a node of a network. It is assigned by the device's manufacturer and saved to the device's memory. The first bytes of a MAC Address are known as the Organizationally Unique Identifier (OUI) and represents the device's manufacturer.

"Device": An electronic processing device capable of performing one or more computing processes, receiving data from one or more other electronic devices, and/or sending data to one or more other electronic devices. Examples of devices include, without limitation, a server, personal computer (PC), laptop computer, tablet, a media system, an entertainment system, a control system (e.g., an in-vehicle media, entertainment, and/or controls system), smart phone, appliance, mechanical controller, thermostat, etc.

"Metadata": There are two types of metadata. "Structural metadata" is data about the design and specification of data structures. Structural metadata cannot be data about data, since at design time, the application contains no data. Rather, structural metadata is data about the containers of data. "Descriptive metadata" is data about data content. This data content is the individual instances of application data.

"Mirrored Object": An object of a class derived from attribute values of an originating object of a class with similar characteristics but owned by a different party.

"Nested Dataset": A dataset stored or referenced as a dataset element within another dataset. Nested datasets are one-to-many relationships embodied in a single parent dataset memory store.

"Normalization": The process of reducing data and metadata to a canonical form to facilitate interoperability. For instance, dataset normalization is the process of organizing datasets and dataset elements within a data store to minimize redundancy and dependency.

"Object": A data representation of a unique instance of a class. Data characteristics ("attribute values") of an object can be stored as dataset elements within a row of a dataset.

"Object Dataset": A structured dataset that includes a column representing a unique object identifier and one or more rows that each represent an object. An objects can be defined from Events.

"Event": A change in the state of an object, including, for a new object, the change from no state into an initial state. For example, when a consumer purchases a car, the car's state changes from "for sale" to "sold".

"Event Notification": A type of message (typically asynchronous) that is produced, published, propagated, detected, or consumed, and contains one or more events. For example, a car dealer's automated system may notify another system of a car object's state change from "for sale" to "sold".

"Object Identifier": An identifier mechanism for naming any object with a globally unambiguous persistent name (e.g., a UUID).

"Query": An encapsulated description of the characteristics of related objects used to retrieve a query resultset. Examples include a SQL script and a Queries dataset.

"Originating Object": The object that originates the attribute values of a derived object, duplicated object, or mirrored object.

"Query Resultset": One or more datasets generated in response to an query that includes one or more attribute values from one or more objects.

"Rendered View": An encapsulated description of a fixed-layout flat document, including the text, fonts, graphics, and other information needed to display or print it. Examples include a Portable Document Format (PDF) file and View dataset.

"Remote Communicator": A communication system on a remote device that can be invoked directly by a communicator on another device. For example, two or more devices may be separated by one or more networks, such as the Internet, rendering each of the devices remote from the other. An example of a remote communicator includes, without limitation, a web service.

"Request": A message sent to a system or remote communicator via a communication protocol that is intended to elicit a responding message. An example of a request includes, without limitation, a Hypertext Transfer Protocol (HTTP) request.

"Response": A message returned from a system or remote communicator via a communication protocol in response to a request (e.g., after processing the request). Examples of responses include, without limitation, an error message, UI event, SQL result set, etc.

"Runtime State": The current processing state of an application runtime, including in-memory applications, state variables and rendered views.

"Runtime Dataset": A dataset of Event-defined Objects that encapsulates a Runtime State.

"Scripting Language": A programming language that supports the writing of scripts. Scripts are programs written for a software environment that automate the execution of tasks which, alternatively, could be executed one-by-one by a human operator. Environments that can be automated through scripting include, without limitation, software applications, web pages within a web browser, shells of operating systems, and several general purpose and domain-specific languages, such as those for embedded systems. Examples of scripting languages include, without limitation, Structured Query Language (SQL), HTML, Printer Control Language (PCL), eXtensible Markup Language (XML), Computer Numeric Control (CNC), etc.

"Semantic Interoperability": Exhibited by two or more devices that are able to automatically interpret the information exchanged meaningfully and accurately in order to produce useful results as defined by the end users of the devices. Further, it represents interoperability at the highest level, which is the ability of two or more systems or elements to exchange information and to use the information that has been exchanged. Semantic interoperability takes advantage of both the structuring of the data exchange and the codification of the data including vocabulary so that the receiving information technology systems can interpret the data. This level of interoperability supports the electronic exchange of information among parties via potentially disparate systems.

"Payload": A structured dataset or string of characters that can be executed, in their entirety, by a compatible system to perform a computing process. Examples of computing processes which may be performed by executing a payload using a system include, without limitation, rendering a display or user interface, manipulating and/or retrieving data, printing a document, invoking an application programming interface (API), controlling a mechanism, transmitting an XML message to a web service, changing the state of a device or system, etc.

"Synchronization": The process of establishing consistency among data from a source to a target data store and vice versa and the continuous harmonization of the data over time.

"Syntactic Interoperability": Exhibited by two or more devices that are capable of communicating with each other using specified data formats, such as XML, SQL or array of arrays.

"System": An integrated set of components for collecting, storing, and processing data and for providing information, knowledge, and digital products. Examples of systems include, without limitation, an application, a database engine, microservice, display driver, voice driver, printer driver, actuator driver, device driver, and a communicator for a component device.

"Triggered Action": An action performed in response to an event that meets a defined condition, rule, or logical test.

"UUID": A universally unique identifier (UUID) is a unique reference number generated by an algorithm that is used as an identifier in computer software. Non-limiting examples of a UUID include alphanumerical text, a sequence of digits (e.g., decimal or hexadecimal digits), a MAC address and time, and may be stored as a 16-byte (128-bit) number. An example of a UUID is "D9A4F842-AF53-4A49-B752-CE58BE46C72D".

2. Overview

The disclosed components of a no-code, event-driven edge computing platform (BEAM platform) include a digital message format, communicator, event processor, runtime dataset, query processor, and event ledger). The BEAM platform facilitates unified management, automation and interoperability of business and device systems on any device and/or across different devices. Such devices may range, for example, from a sensor and actuator (e.g., home thermostat) to a computer (e.g., smart phone), and so on. The disclosed embodiments also facilitate the transport of portable applications (i.e., systems), runtime state, data, events, queries and views on one device (e.g., coffee maker) to another device (e.g., smart phone) via a novel message format for communications. The portable applications can be simple (e.g., an on/off switch) or complex (e.g., robotics or business solutions (e.g., enterprise resource planning (ERP), customer relationship management (CRM), etc.)).

For example, the disclosed components of a BEAM platform can facilitate codeless, rapid development and on-demand delivery of data-centric applications on end-user devices, such as smart phones, tablets, PCs, and in-vehicle navigation systems. The data-centric application may be a control panel, web site, business solution, etc.

In an embodiment, the BEAM message format is an abstraction layer of a communication protocol that defines the data schema ("BEAM Request") for sending one or more types of request, and the data schema ("BEAM Response") for receiving one or more types of response from one device to another, and/or from one system to another on a device.

In an embodiment, each of the one or more rows in the BEAM Request comprises a request type, an identification of a device, a payload, an identification of a system to process the payload, and authentication credentials. In at least one such embodiment, an identification of a device can comprise a device connection type and device connection string. In at least one such embodiment, an identification of a system can comprise a system type and system connection string. In at least one such embodiment, a payload in a row can comprise a payload type and a payload string. In at least one such embodiment, authentication credentials in a row can comprise a credentials type and a credentials string.

In an embodiment, while processing a single payload within a BEAM Request may only perform a portion of creating, reading, updating, and deleting objects within a data store (e.g., reading), the combined processing of all payloads, within the dataset schema of the BEAM Request, perform all aspects of creating, reading, updating, and deleting objects within a data store.

In an embodiment, interoperable data exchange and synchronization among devices is facilitated by processing payloads within a plurality of BEAM Requests transported among devices.

In an embodiment, each of the one or more rows in the BEAM Response comprises an identification of a requesting row in a BEAM Request, a payload type and a payload.

In an embodiment, the message format defines the data schema ("Events") for sending one or more events as a payload within a BEAM Request to be processed by a type of system and stored within a data store (e.g., an event ledger).

In an embodiment, the message format defines the data schema ("Queries") for sending one or more queries as a payload within a BEAM Request, to be processed by a type of system (i.e., a query processor).

In an embodiment, the message format defines the data schema ("View") for sending a rendered view as a payload within a BEAM Request to be processed by a type of system (e.g., a printer or display driver).

In an embodiment, the message format defines the data schema ("Credentials") for sending user authentication credentials within a BEAM Request to be processed by a type of system.

FIG. 1 illustrates the relationships between the BEAM platform on a plurality of devices with at least some of the devices containing a communicator, event processor, runtime dataset, query processor, and event ledger, according to an embodiment. It should be understood that not all of these devices may comprise all of these components, depending on the particular implementation and/or scenario.

The event processor (e.g., EP 281) is a type of system that processes instances of Events. The event processor can reside on multiple devices (e.g., EP 281 on device 200 and EP 381 on device 300) and be a system available to a communicator specific to each device (e.g., communicator 210 on device 200 and communicator 310 on device 300).

The query processor (e.g., QP 283) is a type of system that generates query resultsets from processing instances of Queries. The resultsets are derived from objects within an event ledger (e.g., EL 290 on device 200). The query processor can reside on multiple devices (e.g., QP 283 on device 200 and QP 383 on device 300) and be a system available to a communicator specific to each device (e.g., communicator 210 on device 200 and communicator 310 on device 300).

In an embodiment, the event ledger (e.g., EL 290) is a type of data store that maintains a history of events and is compatible with an event processor and query processor. The event ledger can reside on multiple devices (e.g., EL 290 on device 200 and EL 390 on device 300) and interact with an event processor specific to each device (e.g., EP 281 on device 200 and EP 381 on device 300) and a query processor specific to each device (e.g., QP 283 on device 200 and QP 383 on device 300).

In an embodiment, a request within the BEAM Request may identify the system needed to process a payload. If the system identified in the BEAM Request is on a remote device (e.g., device 100), then the BEAM Request also identifies the remote device. For example, if communicator 210 on device 200 is processing a BEAM Request that has a request identifying a needed system 180 on device 100, communicator 210 may forward the BEAM Request or a new BEAM Request (e.g., BEAM Request 410) to the remote communicator (e.g., communicator 110) for processing.

If a request in the BEAM Request identifies a system on the same device as the processing communicator, the processing communicator (e.g., communicator 210) sends the payload to the identified device system. For example, if communicator 210 processes a request to execute a payload pertaining to identified system 280, communicator 210 may send the payload (e.g., payload 270) to system 280. The executing system may return a response (e.g., response 260) to the invoking communicator. If the request type requires a synchronous response, the invoking communicator generates a BEAM Response that includes the response from the executing system.

(1) If a request in the BEAM Request identifies an event processor (e.g., EP 281) on the same device as the communicator, the communicator may send the payload (e.g., events 271) within the request to the event processor for processing. The event processor may append the events within the payload to an event ledger (e.g., EL 291). The event processor may also create, update, or delete one or more objects within a Runtime dataset (e.g., RD 282). The event processor may also generate and submit a new BEAM Request (e.g., message 261) to the communicator.

(2) If an event-defined process generates one or more queries (e.g., Queries 273), the event-defined process may submit an instruction to the event processor (EP 283) to obtain a query resultsets (e.g., Resultsets 263) related to the one or more queries.

(3) If a request in the BEAM Request identifies a query processor (e.g., QP 283) on the same device as the communicator, the communicator may send the payload (e.g., Queries 273) within the request to the query processor for execution. The query processor may generate one or more query resultsets (e.g., Resultsets 263) from events within an event ledger (e.g., EL 290) and return the resultsets as a response to the invoking communicator.

(6) An event-defined process may also generate a new message payload (e.g., payload 276) for processing. The payload may comprise a system-compatible script in various scripting languages (e.g., HTML, XML, PCL, ZPL, SQL) which can be executed by a system to, without limitation, render a display or user interface, print a document (e.g., shipping label), or change the state of a data store (e.g., data store 291). In an embodiment, the payload within the request comprises a rendered view. In another embodiment, the payload within the request comprises Events.

3. Example Embodiments of a BEAM Message Format 3.1. Example BEAM Request

The following description illustrates a non-limiting embodiment of a message format within a system-to-system message (BEAM Request). The BEAM Request includes syntactically and semantically interoperable data and metadata content that a communicator (e.g., communicator 210) or remote communicator (e.g., communicator 110 or communicator 310) can interpret and process.

The BEAM Request may comprise one or more requests, which may be sent from a communicator (e.g., communicator 210) to a remote communicator (e.g., communicator 110 or communicator 310) using one of a plurality of communication protocols.

In an embodiment, the BEAM Request is represented by a dataset that comprises the columns illustrated in Table 1:

TABLE 1

| CI | Description | Type | Default Value |
|---|---|---|---|
| 0 | Request Type | Number | 0 |
| 1 | Device Connection Type | Number | 0 |
| 2 | Device Connection | Text | |
| 3 | System Type | Number | 0 |
| 4 | System Connection | Text | |
| 5 | Payload Type | Number | 0 |
| 6 | Payload | Text | |
| 7 | Credentials Type | Number | 0 |
| 8 | Credentials | Text | |

Illustrative defined values for specific BEAM Request dataset columns are illustrated in Table 2:

TABLE 2

| CI | Value | Description |
|---|---|---|
| 0 | 0 | Process Payload Asynchronously |
| 0 | 1 | Process Payload and Respond Synchronously |
| 0 | 2 | Return Runtime Dataset |
| 1 | 0 | None (Local Device) |
| 1 | 1 | HTTP |
| 1 | 2 | HTTPS |
| 1 | 3 | Web Socket |
| 1 | 4 | TCP/IP |
| 1 | 5 | MQTT |
| 1 | 6 | AMQP |
| 1 | 7 | CoAP |
| 1 | 8 | Bluetooth |
| 1 | 9 | NFC |
| 3 | 0 | Communicator |
| 3 | 1 | Event Processor |
| 3 | 2 | Query Processor |
| 3 | 3 | View Processor |
| 5 | 0 | Events |
| 5 | 1 | Queries |
| 5 | 2 | View |
| 5 | 3 | BEAM Request |
| 7 | 0 | None (Pre-validated) |
| 7 | 1 | MAC Address |
| 7 | 2 | Party ID/Password/Device ID |
| 7 | 3 | Session ID |

In an embodiment, the value of the Payload element in a row within the BEAM Request dataset comprises an Events dataset when the Payload Type element value (i.e., CI [5]) in the row is 0 (i.e., Events).

In an embodiment, the value of the Payload element in a row within the BEAM Request comprises a Queries dataset when the Payload Type element value (i.e., CI [5]) in the row is 1 (i.e., Queries).

In an embodiment, the value of the Payload element in a row within the BEAM Request comprises a View when the Payload Type element value (i.e., CI [5]) in the row is 2 (i.e., View).

In an embodiment, the value of the Payload element in a row within the BEAM Request comprises a second BEAM Request when the Payload Type element value (i.e., CI [5]) in the row is 3 (i.e., BEAM Request).

In an embodiment, a BEAM Request can be converted to a serialized array of arrays for transport from a communicator to a remote communicator.

3.2. Example BEAM Response

The following description illustrates a non-limiting embodiment of a message format within a system-to-system message (BEAM Response) in response to one or more requests in a BEAM Request. The BEAM Response includes syntactically and semantically interoperable data and metadata content that a communicator (e.g., communicator 210) or remote communicator (e.g., communicator 110 or communicator 310) can interpret and process.

The BEAM Response 425 may comprise one or more responses to one or more requests in a BEAM Request 415, which may be returned to a communicator (e.g., communicator 210) from a remote communicator (e.g., communicator 310) in response to a BEAM Request 415. In an embodiment, this BEAM Response is represented by a dataset that comprises the columns illustrated in Table 3:

TABLE 3

| CI | Description | Type | Default Value |
|---|---|---|---|
| 0 | Request Row | Number | 0 |
| 1 | Payload Type | Number | 0 |
| 2 | Payload | Text | |

The BEAM Response dataset elements may contain a specific nested dataset. Illustrative defined values for the Payload Type dataset element are illustrated in Table 4:

TABLE 4

| CI | Value | Description |
|---|---|---|
| 0 | 0 | Events |
| 0 | 2 | View |
| 0 | 3 | BEAM Request |
| 0 | 4 | Runtime dataset |

In an embodiment, the value of the Request Row element (i.e., CI [0]) in a row in the BEAM Response 425 will contain a row index representing a row in a BEAM Request that invoked a system to generate the row in the BEAM Response 425.

In an embodiment, the value of the Response element (i.e., CI [2]) in a row in the BEAM Response 425 will contain Events when the Payload Type element value (i.e., CI [1]) in the row is 0 (i.e., Events).

In an embodiment, the value of the Response element (i.e., CI [2]) in a row in the BEAM Response 425 will contain a View when the Payload Type element value (i.e., CI [1]) in the row is 2 (i.e., View).

In an embodiment, the value of the Response element (i.e., CI [2]) in a row in the BEAM Response 425 will contain a BEAM Request (e.g., BEAM Request 261) when the Payload Type element value (i.e., CI [1]) in the row is 3 (i.e., BEAM Request).

In an embodiment, the value of the Response element (i.e., CI [2]) in a row in the BEAM Response 425 will contain a Runtime dataset when the Payload Type element value (i.e., CI [1]) in the row is 4 (i.e., Runtime dataset).

In an embodiment, the BEAM Request 425 may be generated from a communicator (e.g., communicator 210 or communicator 310) or a system available to the communicator (e.g., EP 281 or EP 381).

3.3. Example Events in a BEAM Request

The following description illustrates a non-limiting embodiment of one or more events within a BEAM Request (Events). The Events include syntactically and semantically interoperable data and metadata content that an event processor interfaced with or comprised in any communicator or remote communicator (e.g., EP 281 interfaced with or comprised in communicator 210, or EP 381 interfaced with or comprised in communicator 310) can interpret and process.

Figure 2:
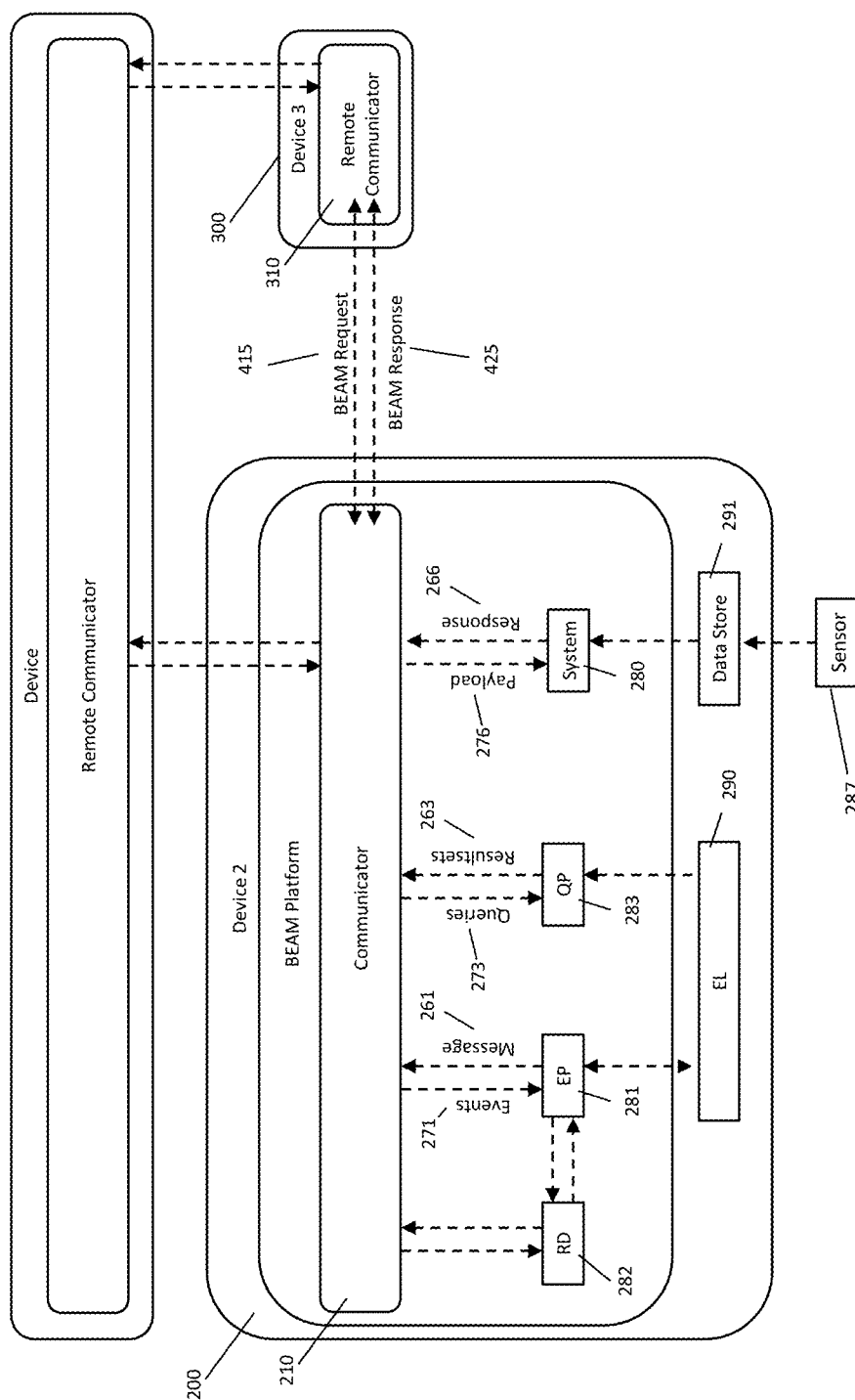
FIG. 2 illustrates a device utilizing components of a BEAM platform, and interacting with other systems and data stores, including event ledgers, according to at least one embodiment.

In an embodiment, the Events may be included in a payload within a row of a BEAM Request dataset. In an embodiment, Events that have been processed by an EP may be stored in a dataset in an event ledger (e.g., EL 290) as illustrated in FIG. 2. In an embodiment, the Events may be represented by a multi-row dataset (e.g., Events 271) with the defined columns illustrated in in FIG. 4 and Table 5, wherein each row represents an event instance:

TABLE 5

| CI | Name | Type |
|---|---|---|
| 0 | Time Stamp | UTC Date/Time |
| 1 | Event Source | Identifier |
| 2 | Object Class | Identifier |
| 3 | Object | Identifier |
| 4 | Attribute | Identifier |
| 5 | Attribute Value | Variant |
| 6 | UOM | Identifier |

In an embodiment, the "Time Stamp" column represents when the event in the row occurred.

In an embodiment, the "Event Source" column identifies a system of a device that produced the event.

In an embodiment, the "Object Class" column identifies a category of objects sharing the same attributes.

In an embodiment, the "Object" column identifies an object within the identified Object Class.

In an embodiment, the "Attribute" column identifies an attribute of the identified object.

In an embodiment, the "Attribute Value" column represents the value of the identified attribute of the identified object.

In an embodiment, the "UOM" column identifies a measurement unit for the Attribute Value, when the value represents a quantity.

In an embodiment, the Events define a state and characteristics of one or more objects at one or more points in time based on the timestamp within each row.

4. Example Embodiment of an Communicator

The following description illustrates a non-limiting embodiment of a communicator (e.g., communicator 110, 210, and/or 310). FIG. 2 illustrates the relationships between a communicator 210, an event processor 281, as a type of system, a query processor 283, as a type of system, a system 280, as a type of system, and a remote communicator 310 and a remote device 300, according to an embodiment.

In an embodiment, communicator 210 monitors incoming requests from remote devices (e.g., remote communicator 310). When a BEAM Request is received (e.g., BEAM Request 415), communicator 210 may process one or more requests in the BEAM Request and may generate one or more responses in a BEAM Response (e.g., BEAM Response 425) that is returned to the requesting remote communicator.

In an embodiment, a system (e.g., event processor 281) of device 200 may generate one or more requests in a BEAM Request (e.g., Message 261) and invokes communicator 210 to process the requests.

In an embodiment, a system (e.g., EP 281) of device 200 can process datasets returned as query resultsets (e.g., Resultsets 263) in a BEAM Response.

In an embodiment, for each request in a BEAM Request (e.g., BEAM Request 415), communicator 210 may invoke a system (e.g., EP 281, QP 283, or system 280) of device 200 that is identified within the request to process a payload that is contained within the request, which may generate a response. Communicator 210 creates a BEAM Response that contains one or more system responses.

In an embodiment, for one or more rows in a BEAM Response (e.g., BEAM Response 425) returned to communicator 310 that contain a BEAM Request (e.g., Payload 276), communicator 310 processes the one or more rows in the BEAM Request.

In an embodiment, communicator 210 returns one or more rows in a BEAM Response (e.g., BEAM Response 425) to a system that generated the BEAM Request (e.g., BEAM Request 415).

In an embodiment, a system may generate a response in a BEAM Response (e.g., BEAM Response 425) that comprises a runtime dataset (e.g. RD 282).

In an embodiment, the communicator may invoke a second communicator, as a system, on the same device to process a payload. In at least one such embodiment, the second communicator is interfaced to a subsystem of the device, wherein the subsystem comprises a second set of components of the BEAM platform. In at least one such embodiment, the subsystem within a device interacts with the communicator in a manner similar to a remote device. In at least one such embodiment, the payload submitted to the second communicator by the communicator comprises a BEAM Request and a response returned by the second communicator to the communicator comprises a BEAM Response.

In an embodiment, a system (e.g., system 280) can be invoked by a communicator (e.g., communicator 210) to convert a payload (e.g., payload 276) comprising a view to a format that can be processed by a display engine or print engine to display a user interface or print a document.

In an embodiment, a system (e.g., system 280) can be invoked by a communicator (e.g., communicator 210) to convert a payload comprising Events (e.g., Events 271) generated by an event processor (e.g., EP 281) to a format that can be processed by a database engine or microcontroller to change the state of a data store, or by a display engine or print engine to display a user interface or print a document.

In an embodiment, the data store can comprise the current state of a port pin collection of a microcontroller. In at least one such embodiment, a change in the state of the port pins corresponds to a change in the state of a data store, and vice versa.

In an embodiment, a change in the state of a data store can trigger a system to generate Events that reflect the change. In at least one such embodiment, the system (e.g., system 280) can submit the Events (e.g., Events 271) as a payload to a communicator (e.g., communicator 210) for processing.

In an embodiment, the communicator may submit a payload, originating from a system, to an event processor (e.g., EP 281) for processing when the payload comprises events (e.g., Events 271).

In an embodiment, one or more attribute values of one or more objects in an EL (e.g., EL 290), defined by the events originating from a system (e.g., system 280), reflect the current state of the data store (e.g., data store 291) interfaced with the system.

In an embodiment, the communicator may convert a message or payload in a non-conforming format to a format conforming to the BEAM Platform prior to sending a payload to a conforming system. In another embodiment, the communicator may convert a message or payload to a non-conforming format from a format conforming to the BEAM Platform prior to sending a payload to a non-conforming system.

Figure 8:
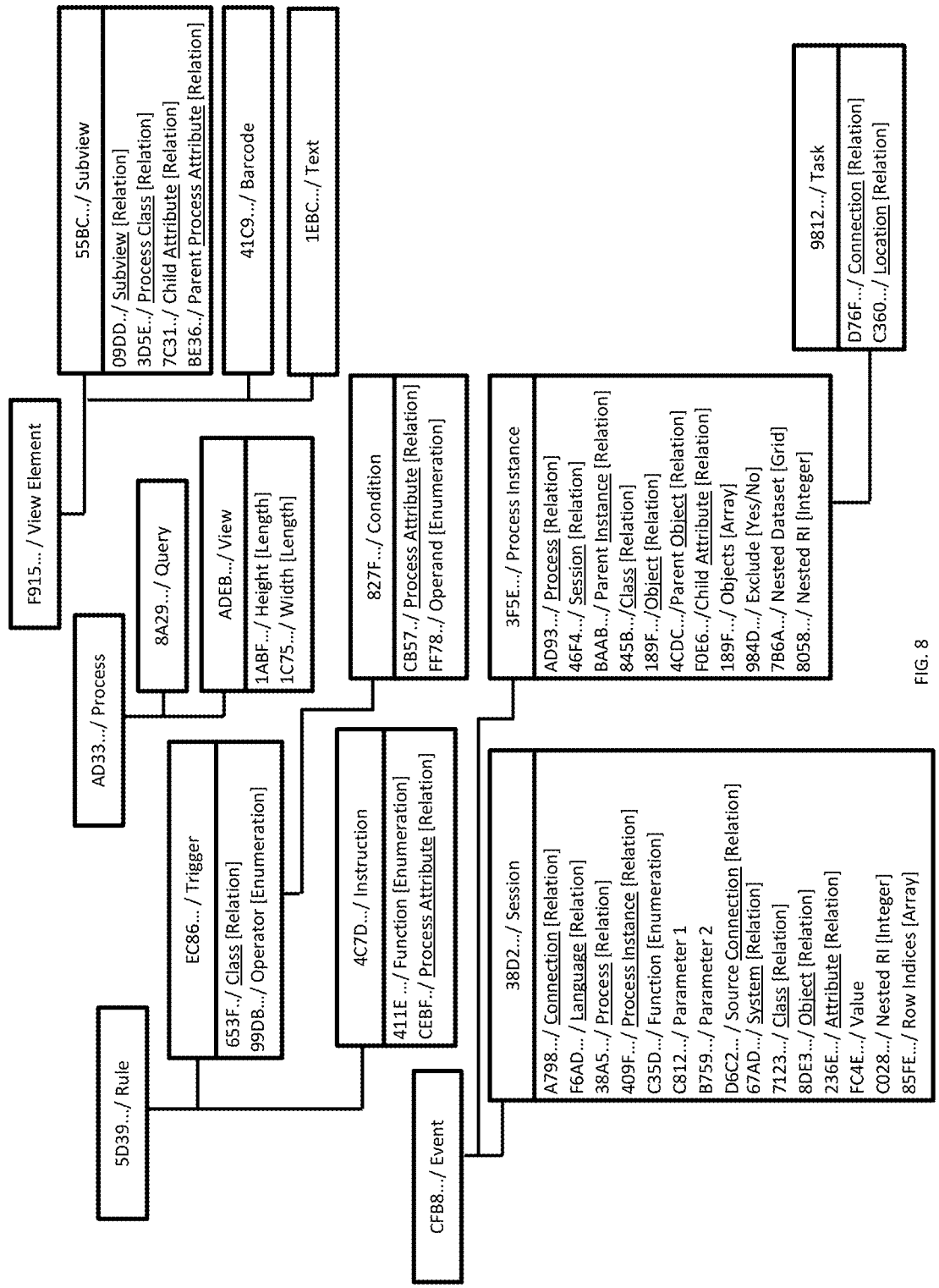
Figure 9:
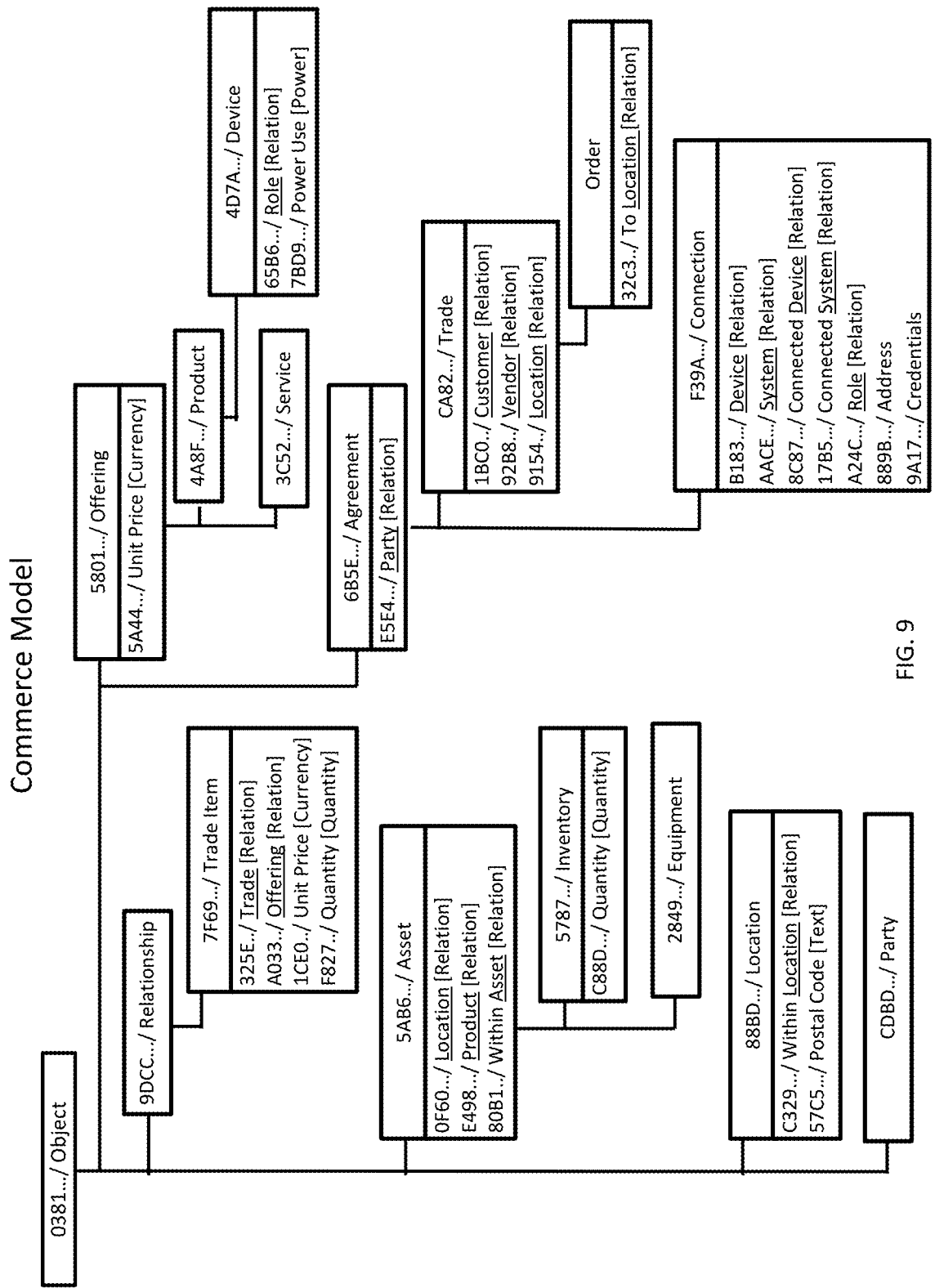
Figure 10:
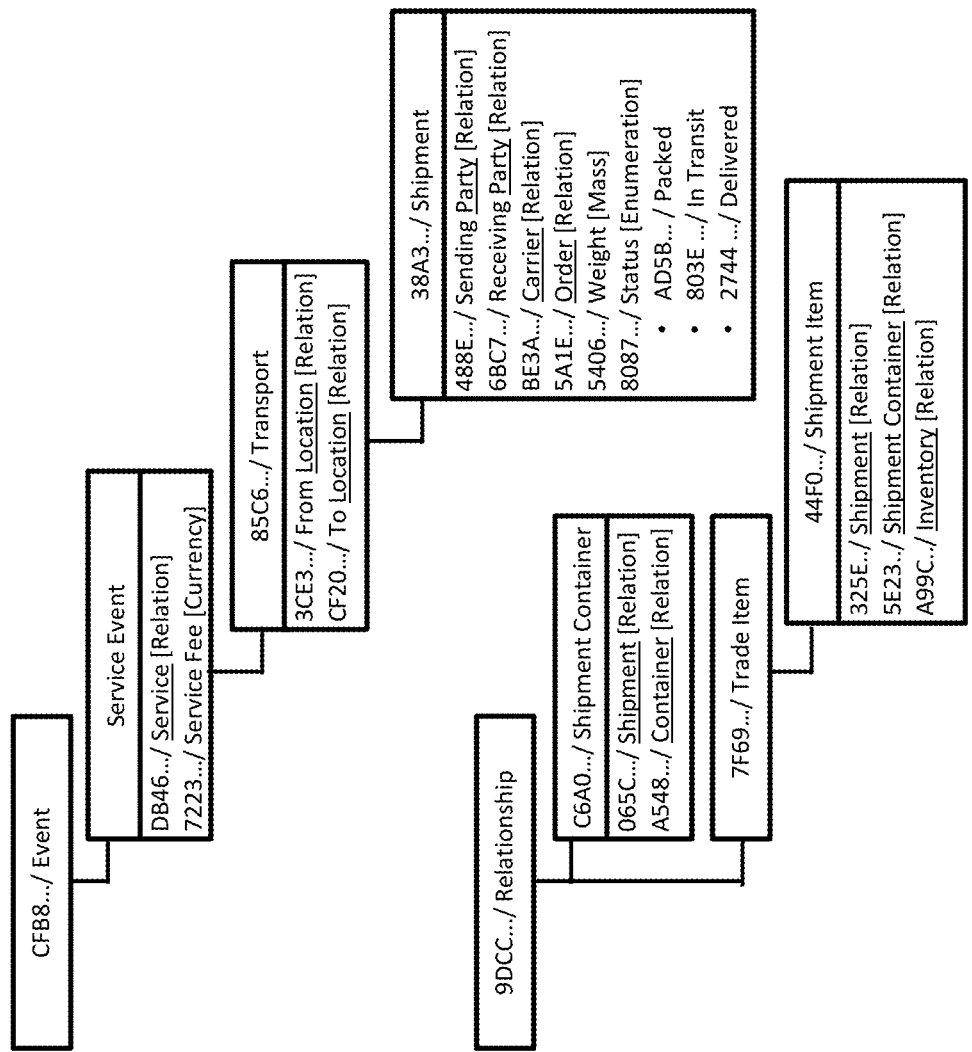
Figure 11:
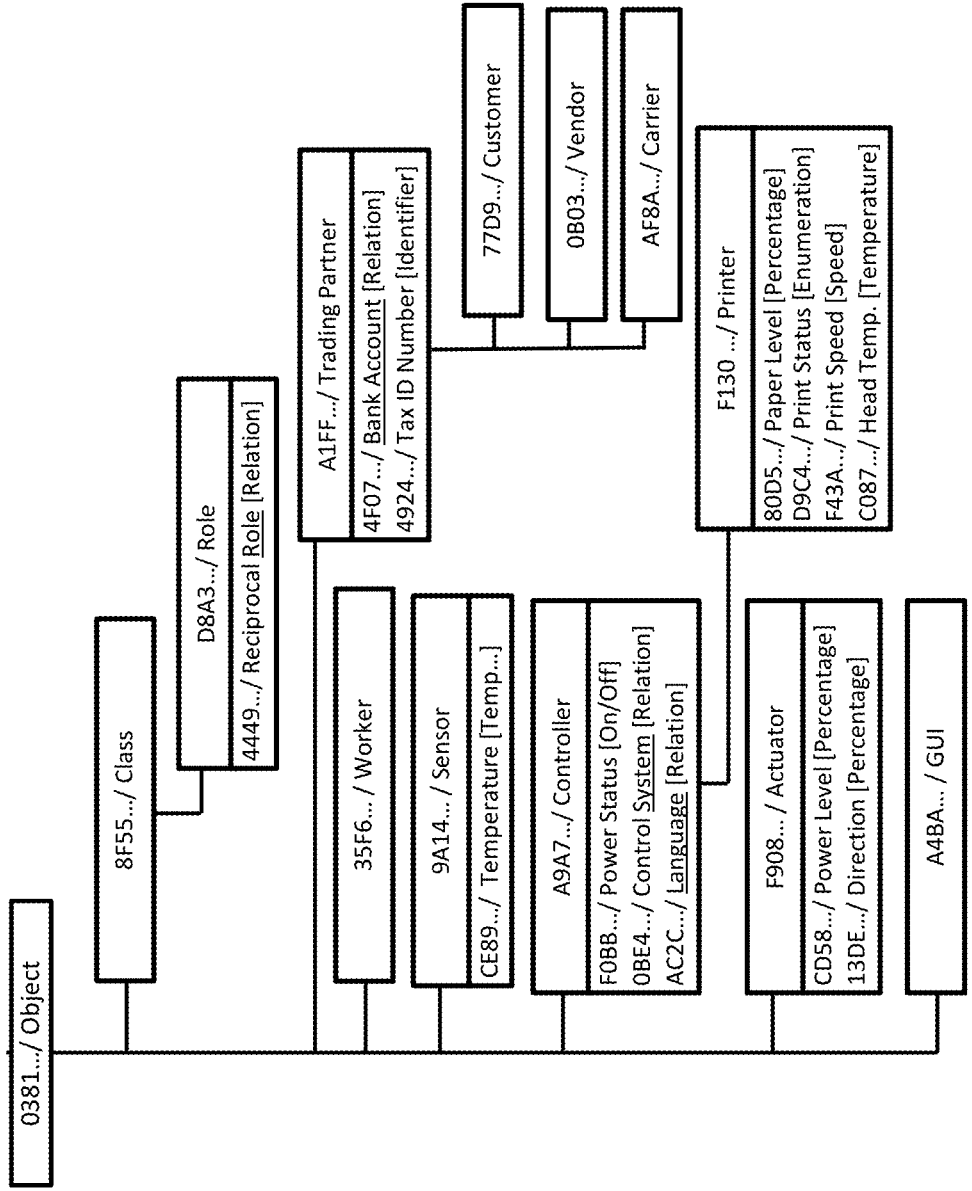

In an embodiment, the communicator (e.g., communicator 210) initializes a runtime dataset (e.g., RD 282), as illustrated within the JavaScript function representing communicator 210 in FIG. 12. In an embodiment, a runtime dataset is initialized with a row (e.g., RI [0] in RD 282 in FIG. 13) that comprises identifiers of attributes of a session class (object identifier 38D2 . . . ) within a system model as illustrated in FIG. 8. In an embodiment, the runtime dataset is initialized with a second row (e.g. RI [1] in RD 282 in FIG. 13) that comprises a new object of the session class. In an embodiment, the new session object is assigned a new object identifier (e.g., "064C . . . ") in the first column of the runtime dataset (e.g., index location [2][0] in RD 282 in FIG. 13).

In an embodiment, the communicator (e.g., communicator 210) sends an event in an Events dataset (e.g. Events 271 in FIG. 13) to the runtime dataset (e.g., RD 282) by copying element values within the event (e.g., "F39A . . . " in index location [0][3] of Events 271 in FIG. 13) to corresponding attribute values of the active session object (e.g., index location [1][4] in RD 282 in FIG. 13) within the runtime dataset.

5. Example Embodiment of an Event Processor

The following description illustrates a non-limiting embodiments of an event processor (EP), as a system of a device. FIG. 2 illustrates the relationships between an EP 281, a communicator 210, a runtime dataset 282, and an event ledger 290, according to an embodiment.

In an embodiment, the event processor (e.g., EP 281) comprises a set of functions that each perform a value computation, manipulation, or retrieval within a runtime dataset (e.g., RD 282). In an embodiment, each function is represented as an object of an enumerator class of a class hierarchy, as illustrated in FIG. 16.

In an embodiment, a core set of functions within the event processor includes a FIND function, a GET function, a SET function, a TRANSFER function, a PROCESS function, an EVENT function, and a SEND function. FIG. 12 illustrates an embodiment of the FIND function (FIND 281B), the GET function (GET 281C), and the SET function (SET 281D) as JavaScript functions within EP 281.

In an embodiment, each of the core set of functions is identified by an object identifier in the enumerator representations in FIG. 16. In this embodiment, the identifier for the FIND function is "977F . . . "

In an embodiment, the FIND function computes a value comprising an array of row indices within a runtime dataset, where each row identified in the array comprises attribute values that satisfy a condition. In an embodiment, the condition is represented by attribute values within a row in the runtime dataset. In an embodiment, the attribute values representing the condition are based on an object of a Condition class or a Trigger class illustrated in FIG. 8, where each object may be represented in a runtime dataset. In an embodiment, a Trigger object is represented by a row in a runtime dataset (e.g., RI [88] in RD 282 in FIG. 28). In an embodiment, the FIND function sets an attribute value within the runtime dataset to the computed value. In an embodiment, the condition can comprise the attribute value that is set to the computed value from a previous execution of the FIND function. In an embodiment, the attribute values representing the condition and the attribute value that is set to the computed value are within a row in the runtime dataset that represents an object of a Session class, as illustrated in RI [1] in RD 282 in FIG. 13.

In an embodiment, the GET function retrieves an attribute value from a runtime dataset based on an index location that is derived from attribute values within a row in the runtime dataset that represent an attribute identifier and a row index. In an embodiment, the column index is derived from the location of the attribute identifier in the first row of the runtime dataset. In an embodiment, the derived index location is within a dataset nested within an attribute value in the runtime dataset. In an embodiment, the GET function sets an attribute value within the runtime dataset to the retrieved value. In an embodiment, the attribute values representing the attribute identifier and row index, and the attribute value that is set to the retrieved value are within a row in the runtime dataset that represents an object of a Session class, as illustrated in RI [1] in RD 282 in FIG. 13.

In an embodiment, the SET function sets a first attribute value in a runtime dataset to a second attribute value within the runtime dataset. In an embodiment, the index location of the first attribute value is derived from attribute values within a row in the runtime dataset that represent an attribute identifier and a row index. In an embodiment, the column index is derived from the location of the attribute identifier in the first row of the runtime dataset. In an embodiment, when the attribute identifier is not located in a column within the first row, the SET function appends a new column to the runtime dataset and sets the element value of the new column within the first row to the attribute identifier. In an embodiment, when the row index is not within the runtime dataset, the SET function appends a new row to the runtime dataset and sets the first attribute value to a column within the new row. In an embodiment, the derived index location is within a dataset nested within an attribute value in the runtime dataset. In an embodiment, the second attribute value was set from the GET function. In an embodiment, the attribute values representing the attribute identifier and row index are within a row in the runtime dataset that represents an object of a Session class, as illustrated in RI [153] in RD 282 in FIG. 36.

In an embodiment, the TRANSFER function sets a first attribute value in a row within the runtime dataset to a second attribute value within the same row. In an embodiment, the index location of the first attribute value is derived from a third attribute value within the same row. In an embodiment, the row index is the index of the same row. In an embodiment, the column index is derived from the location of the attribute identifier in the first row of the runtime dataset. In an embodiment, the first, second, and third attribute values are within a row in the runtime dataset that represents an object of a Session class, as illustrated in RI [153] in RD 282 in FIG. 36.

In an embodiment, the PROCESS function executes sequential instructions associated with an event-defined process. In an embodiment, the process and instructions are represented by rows within a runtime dataset. In an embodiment, attribute values within a row representing a sequential instruction identify a function (e.g. GET) and the input parameters of the function. In an embodiment, the identified function and input parameters are copied by the PROCESS function to corresponding attribute values within a row in the runtime dataset that represents an object of a Session class, as illustrated in RI [1] in RD 282 in FIG. 13. In an embodiment, the PROCESS function invokes the function (e.g., GET) identified within the sequential instruction.

In an embodiment, when the identified function is the PROCESS function, the PROCESS function invokes an instance of itself.

In an embodiment, the EVENT function invokes the SET function to set an attribute value based on an event. In an embodiment, the event comprises an identification of an object class, and an identification of an object, an identification of an attribute of the object class, and an attribute value. In an embodiment, the EVENT function invokes the FIND function to obtain the row index comprising the identified object prior to invoking the SET function. In an embodiment, one or more executed sequential instructions set attribute values within a row in the runtime dataset to the element values of the event. In an embodiment, these attribute values are within a row in the runtime dataset that represents an object of a Session class, as illustrated in RI [153] in RD 282 in FIG. 36. In an embodiment, the EVENT function invokes the PROCESS function to execute a specific event-defined process that further processes the event.

In an embodiment, the SEND function sends a message (e.g., message 261 in FIG. 39) to a communicator (e.g. communicator 210). In an embodiment, the contents of the message and its payload are represented by attribute values within a runtime dataset (e.g., RD 282).

In an embodiment, processing sequential instructions may create a new row within a runtime dataset that represents an instance of a process (e.g., RI [154] in RD 282 illustrated in FIG. 35).

In an embodiment, processing sequential instructions may create a nested dataset within an attribute value of a runtime dataset (e.g., index location [154][90] in RD 282 illustrated in FIG. 35). In an embodiment, the attributes and objects included in the columns and rows of the nested dataset are identified and constrained by columns and conditions associated with a process that is associated with the sequential instructions. In an embodiment, the process columns (i.e., Process Attribute objects) and conditions (i.e. Condition objects) are represented by rows in the runtime dataset, as illustrated in row indices [77]-[87] in RD 282 in FIG. 27.

Figure 39:
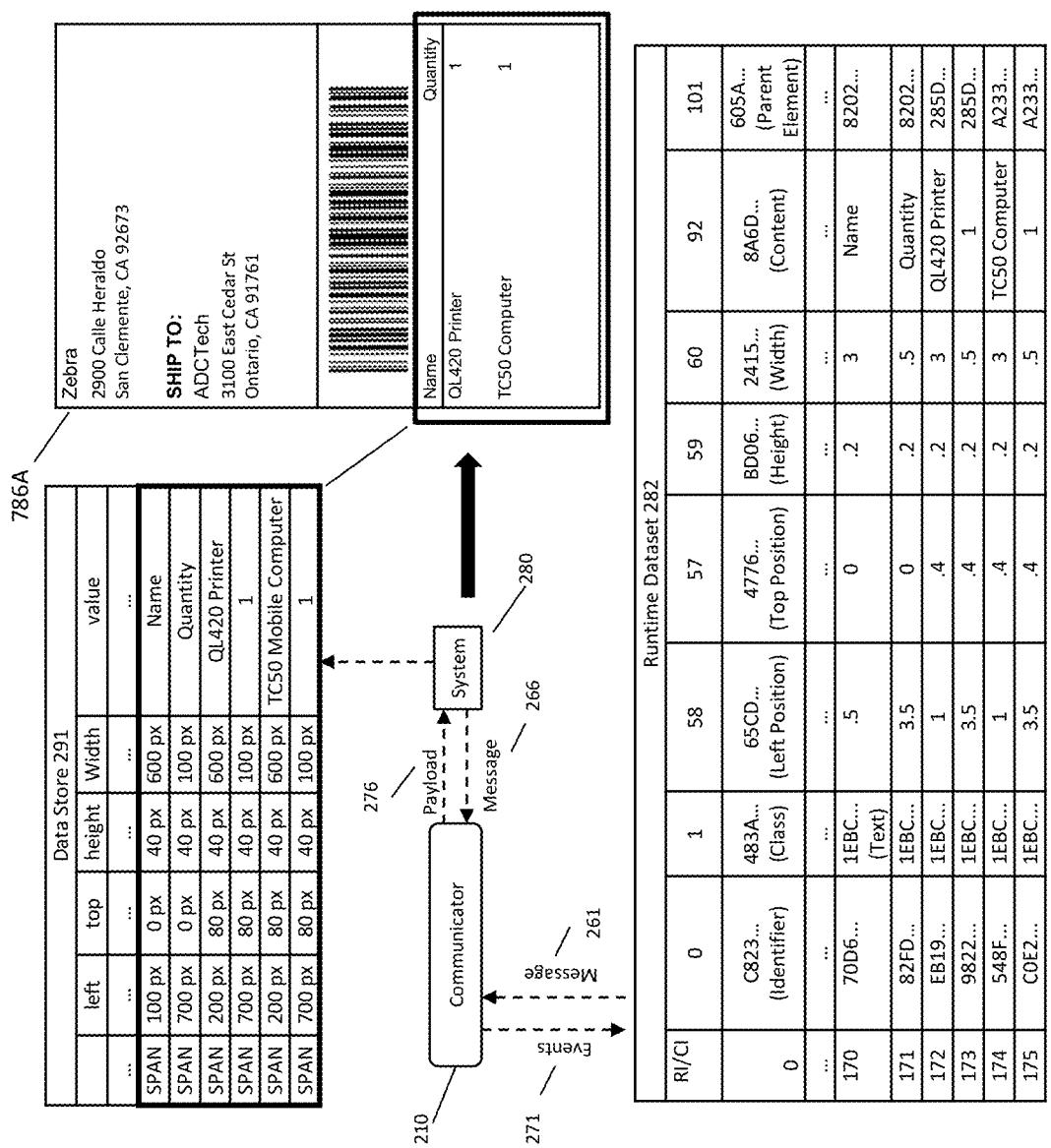

In an embodiment, processing sequential instructions may convert identifiers within an Events dataset to alternate identifiers associated with a system model, as illustrated in FIG. 39. In an embodiment, an alternate identifier may identify a port pin of a microcontroller, as illustrated in RI [120] and RI [121] within RD 282 in FIG. 31. In an embodiment, an alternate identifier may represent a state of a port pin of a microcontroller, as illustrated in RI [122], RI [123] and RI [124] within RD 282 in FIG. 31.

In an embodiment, processing sequential instructions may convert the alternate identifiers within an Events dataset to identifiers within a common ontology to enable semantic interoperability.

In an embodiment, processing sequential instructions may convert a quantity represented by an attribute value within an Events dataset to a quantity corresponding to a measurement unit associated with a system model, as illustrated in RI [65] within RD 282 in FIG. 24.

In an embodiment, processing sequential instructions may generate attribute values within a runtime dataset that represent a message and its payload. In an embodiment, processing a sequential instruction may send a message and its payload to a communicator.

In an embodiment, processing sequential instructions associated with one or more related processes may generate a View (e.g., payload 276 in FIG. 39) that can be displayed or printed by a system (e.g., display system 280 in FIG. 40). In an embodiment, the View comprises values within a nested dataset (e.g., nested dataset 4 in FIG. 38) that was generated by processing sequential instructions.

In an embodiment, one or more event-defined processes may be represented using a programming language.

6. Example Embodiment of an Event-Defined Runtime Dataset

The following description illustrates a non-limiting embodiments of a runtime dataset (RD). FIG. 2 illustrates the relationships between an RD 282, a communicator 210, and an event processor 281, according to an embodiment.

In an embodiment, a runtime dataset (e.g., RD 282) is initialized by a communicator (e.g., communicator 210). In an embodiment, a runtime dataset represents a two-dimensional structure having one or more rows and a plurality of columns.

Figure 13:
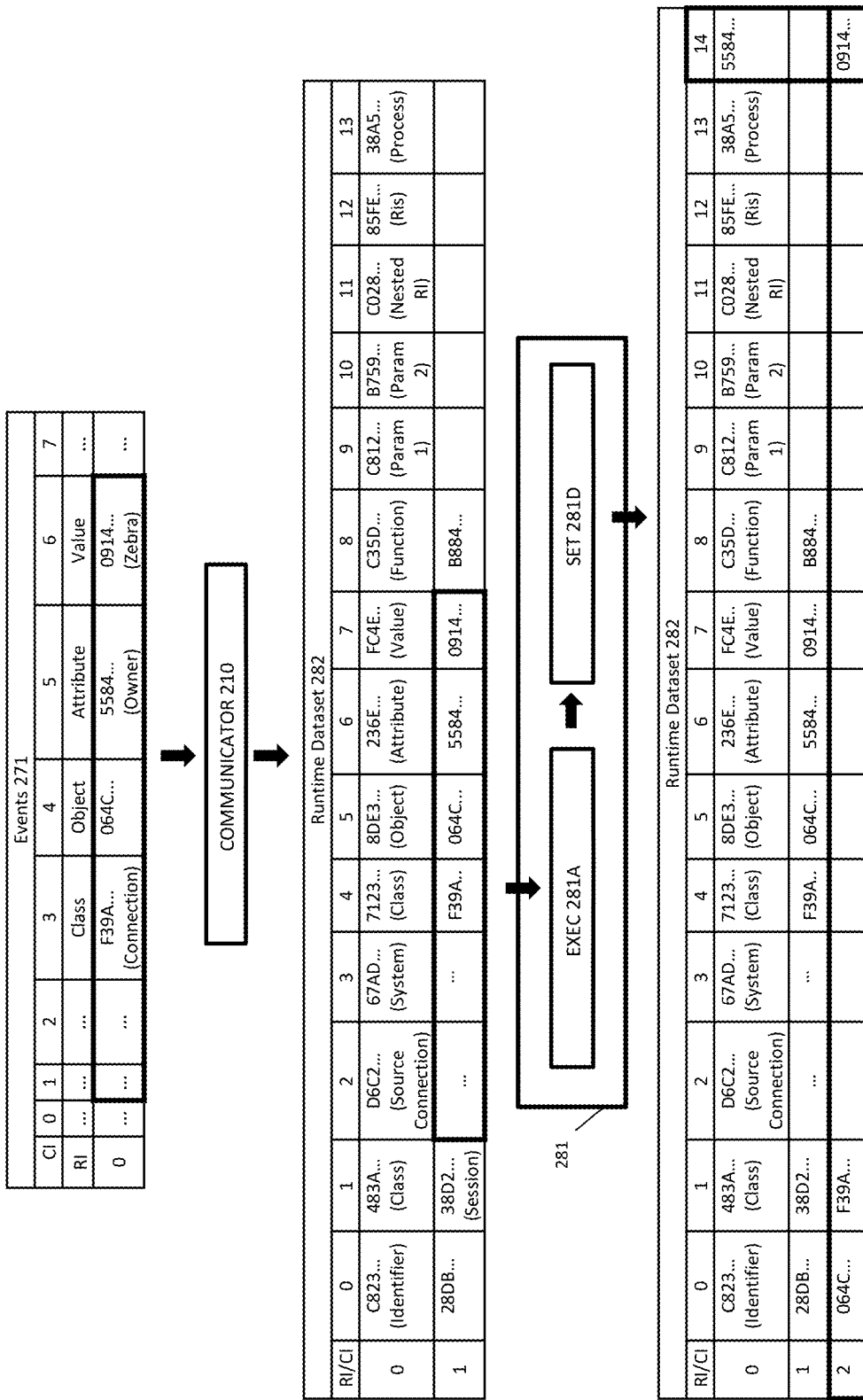
FIG. 13 illustrates how the SET function can add rows and columns to the Runtime dataset to support new objects and attributes identified within an event.
Figure 14:
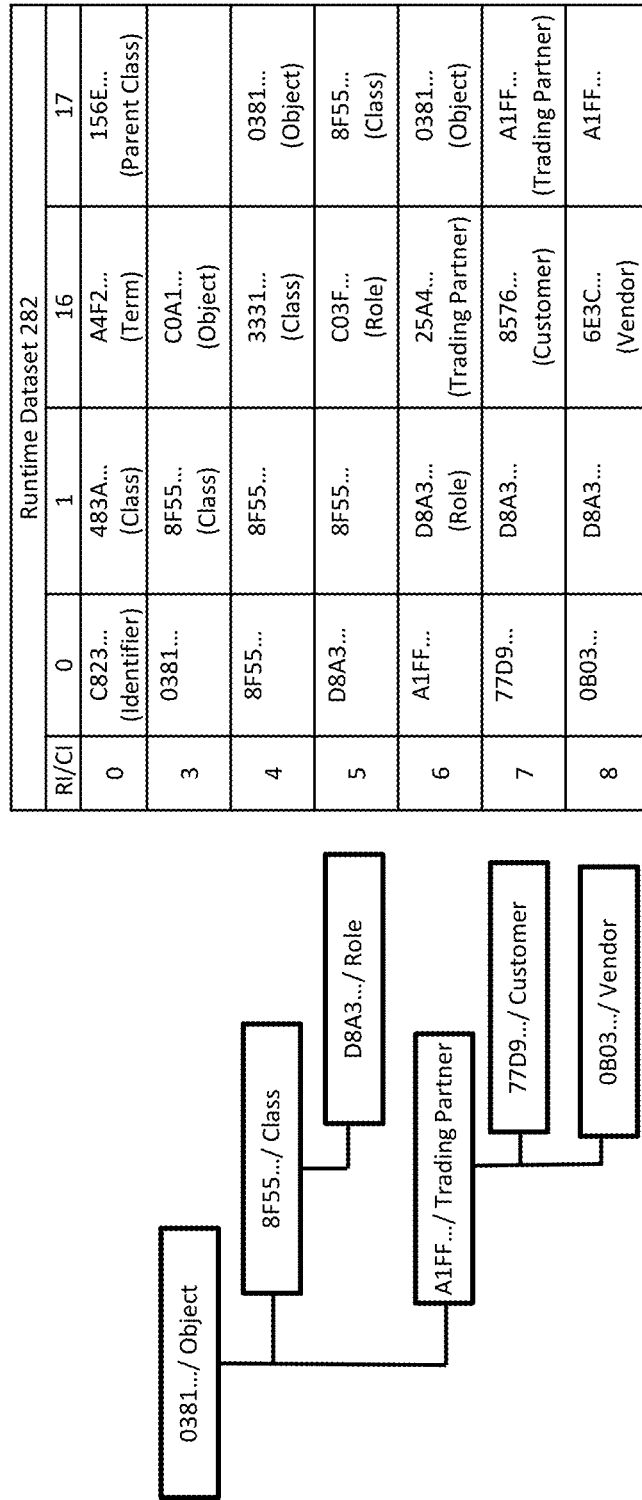
Figure 20:
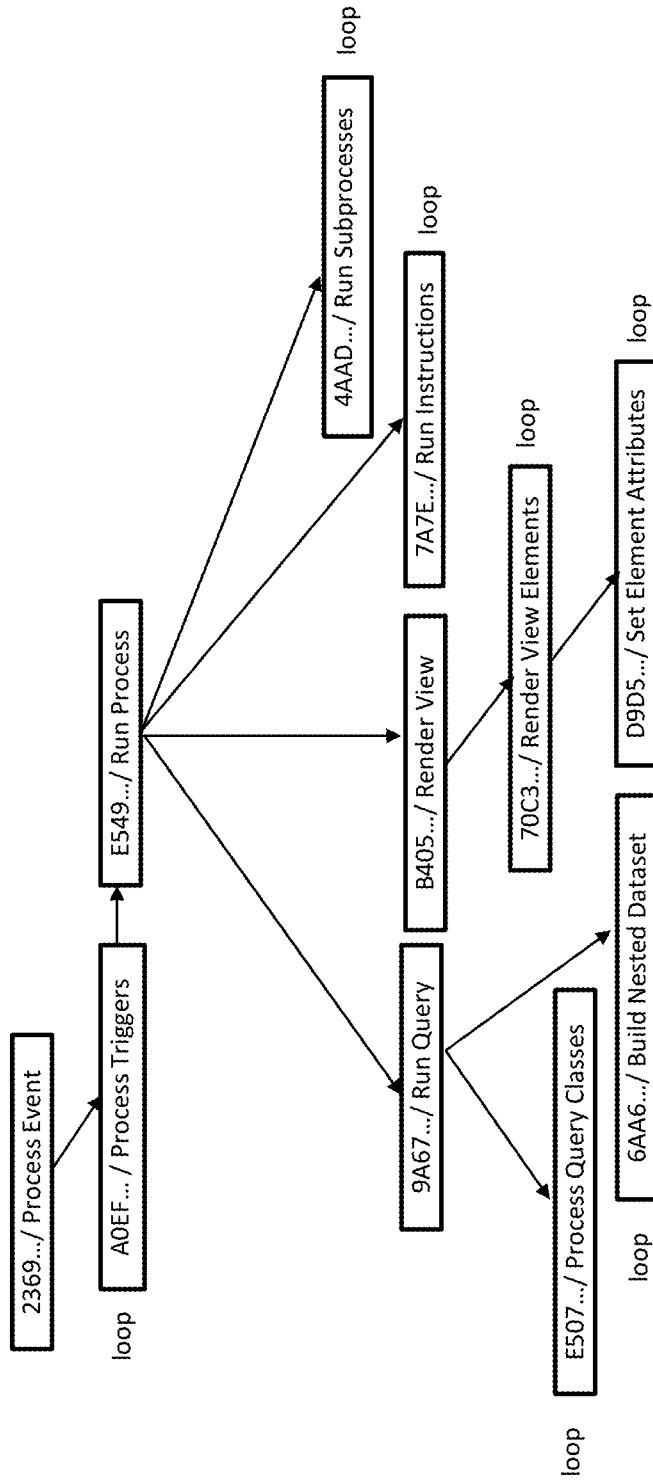
Figure 34:
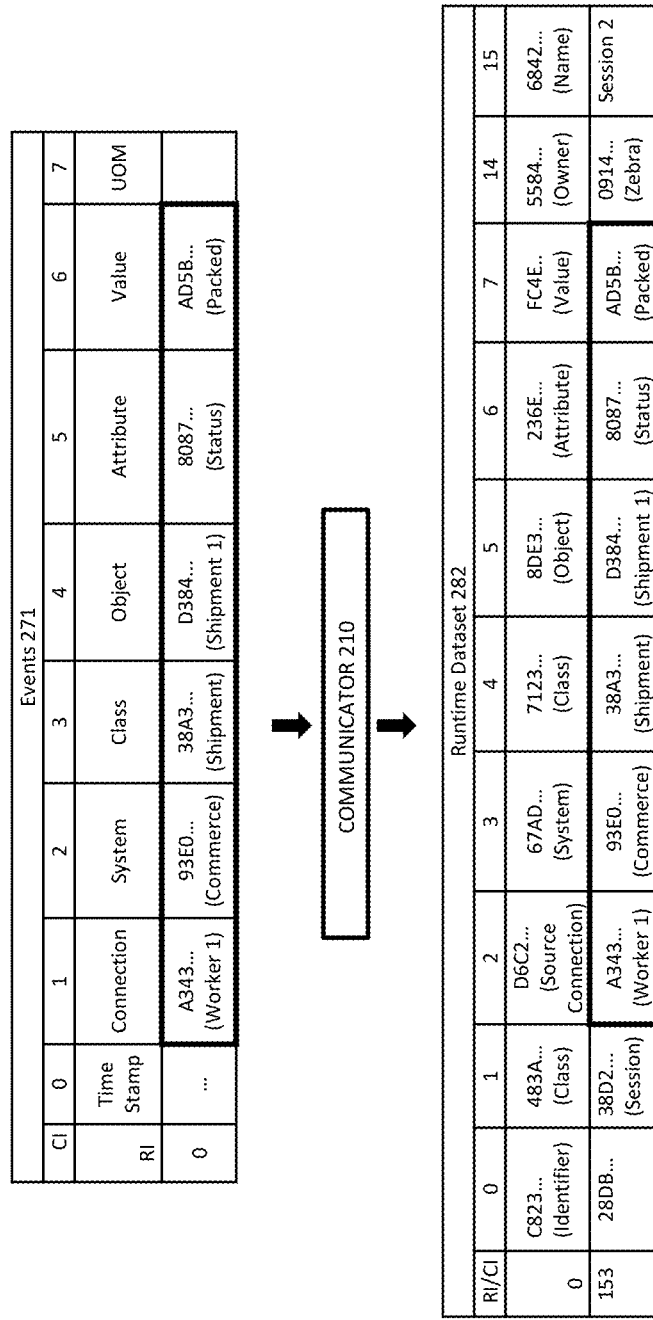
Figure 36:
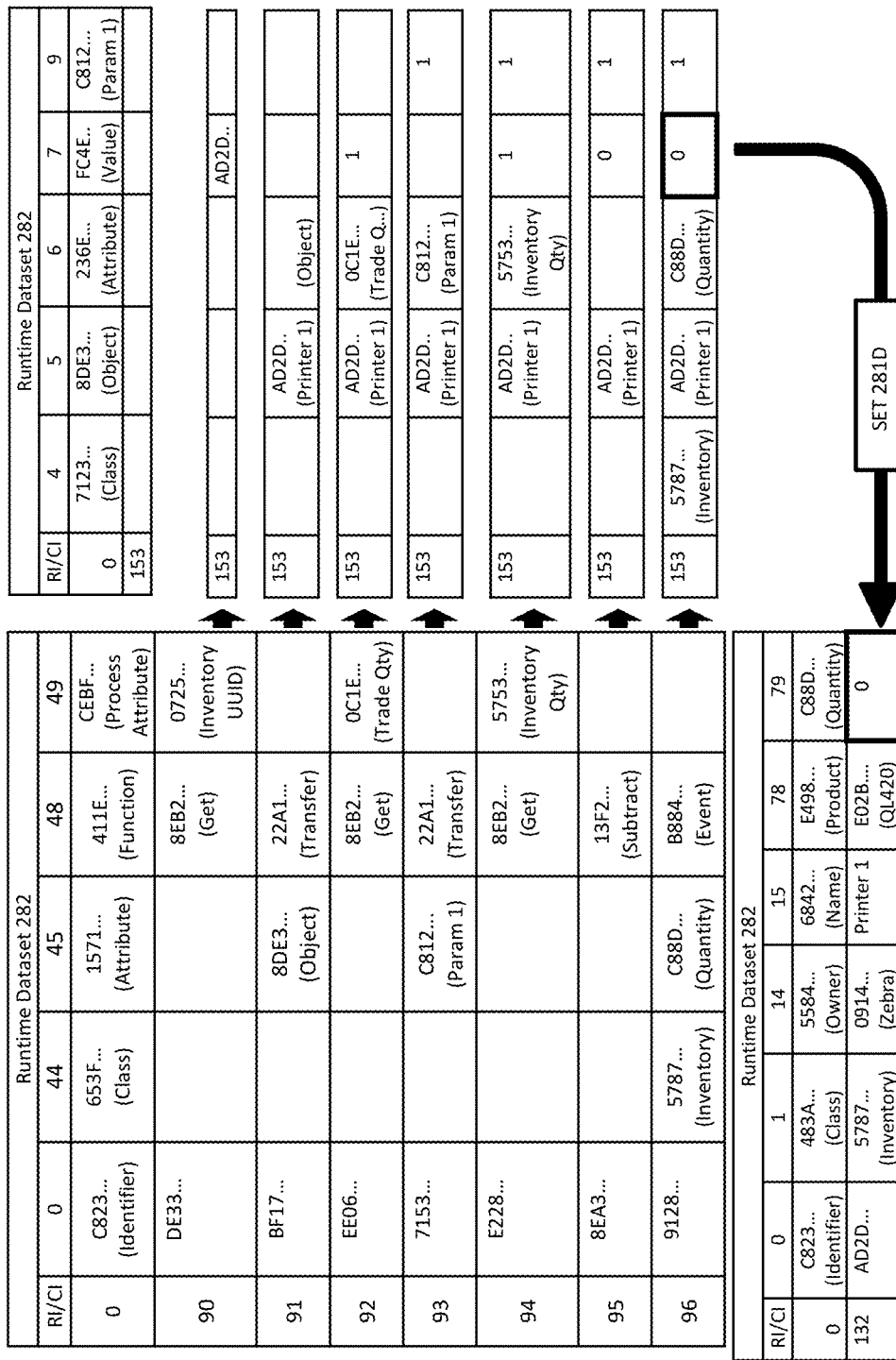
Figure 37:
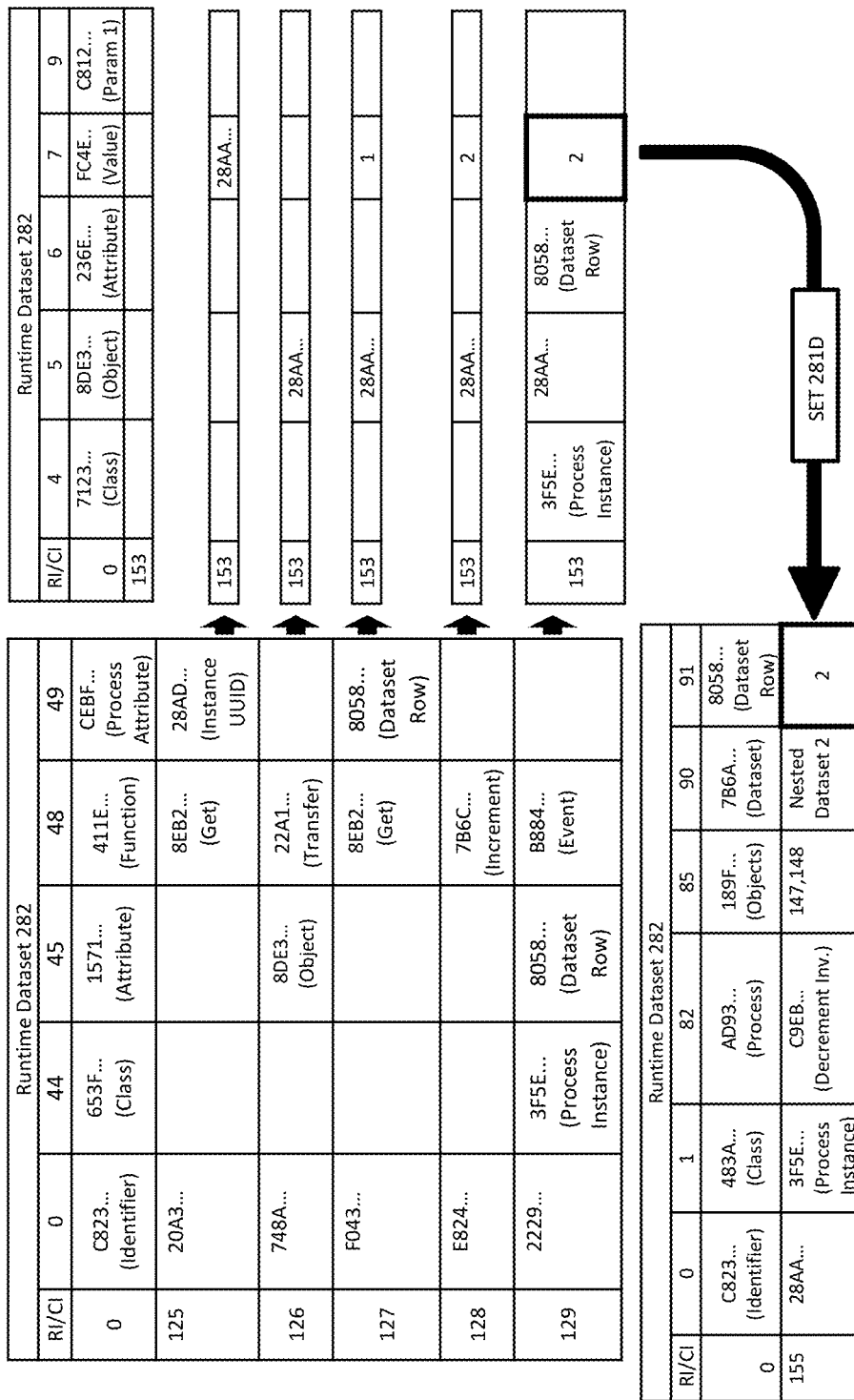

In an embodiment, rows and columns are appended to a runtime dataset by an event processor, as illustrated in FIG. 13.

In an embodiment, element values within a runtime dataset represent attribute values.

In an embodiment, the first row in a runtime dataset comprises unique identifiers of attributes, as illustrated in RI [0] in RD 282 in FIG. 13.

In an embodiment, the first column in a runtime dataset comprises unique identifiers of objects, as illustrated in CI [0] in RD 282 in FIG. 13.

In an embodiment, the second column in a runtime dataset comprises the identifier of an object class associated with the object identified in the first column, as illustrated in CI [1] in RD 282 in FIG. 13.

In an embodiment, the location of an attribute value within a runtime dataset is derived from a column index and a row index. In an embodiment, the column index is the location of the attribute identifier in the first row and the row index is the location of the object identifier in the first column.

In an embodiment, an attribute value in a row within a runtime dataset (e.g., index location [10] [16] in RD 282 in FIG. 18) comprises an identifier of a related object represented by another row in the runtime dataset (e.g. RI [22] in RD 282 in FIG. 18).

7. Example Utility

An implementation of a sample utility which utilizes an embodiment of the disclosed BEAM platform for unified commerce, edge computing, and the internet of things will now be described.

FIGS. 34-39 illustrate embodiments of processing by an event processor, in response to a triggering event, to render a view of commerce-related information based on event-defined processes and processed objects within a Runtime dataset. A portion of the processing generates a nested Dataset 4, nested Dataset 5, and nested Dataset 6.

A nested Dataset 5 is generated as an attribute value at index location [158][90] in RD 282 illustrated in FIG. 35. The element values within nested Dataset 5 are copied from attribute values within the runtime dataset, as shown in Table 6, during processing of sequential instructions.

TABLE 6

| Process | Copy from Runtime Dataset | | | Copy to Nested Dataset 5 | | |
|---|---|---|---|---|---|---|
| ID | RI | CI | FIG. Shown | RI | CI | FIG. Shown |
| | 145 | 67 | 33 | 1 | 4 | 38 |
| | 143 | 67 | 33 | 2 | 4 | 38 |
| | 143 | | 33 | 1 | 5 | 38 |
| | 142 | | 33 | 2 | 5 | 38 |

A nested Dataset 6 is generated as an attribute value at index location [159][90] in RD 282 illustrated in FIG. 35. The element values within nested Dataset 6 are copied from attribute values within the runtime dataset, as shown in Table 7, during processing of sequential instructions.

TABLE 7

| Process | Copy from Runtime Dataset | | | Copy to Nested Dataset 6 | | |
|---|---|---|---|---|---|---|
| ID | RI | CI | FIG. Shown | RI | CI | FIG. Shown |
| | 145 | 15 | 33 | 1 | 4 | 38 |
| | 143 | 15 | 33 | 2 | 4 | 38 |
| | 142 | 15 | 33 | 3 | 4 | 38 |
| | 145 | 68 | 33 | 4 | 4 | 38 |

A nested Dataset 4 is generated as an attribute value at index location [157][90] in RD 282 illustrated in FIG. 35. The element values within nested Dataset 4 are copied from attribute values within the runtime dataset, as shown in Table 8, during processing of sequential instructions.

TABLE 8

| Process | Copy from Nested Dataset 6 | | | Copy to Nested Dataset 4 | | |
|---|---|---|---|---|---|---|
| ID | RI | CI | FIG. Shown | RI | CI | FIG. Shown |
| | 1 | 0 | 38 | 0 | 0 | 38 |
| | 2 | 0 | 38 | 0 | 1 | 38 |
| | 3 | 0 | 38 | 0 | 2 | 38 |
| | 4 | 0 | 38 | 0 | 3 | 38 |
| | 1 | 4 | 38 | 1 | 0 | 38 |
| | 2 | 4 | 38 | 1 | 1 | 38 |
| | 3 | 4 | 38 | 1 | 2 | 38 |
| | 4 | 4 | 38 | 1 | 3 | 38 |

Attribute values within the runtime dataset are copied from element values within nested Dataset 4, as shown in Table 9, during processing of sequential instructions.

TABLE 9

| Process | Copy from Nested Dataset 4 | | | Copy to Runtime Dataset | | |
|---|---|---|---|---|---|---|
| ID | RI | CI | FIG. Shown | RI | CI | FIG. Shown |
| | 1 | 0 | 38 | 162 | 92 | 38 |
| | 1 | 1 | 38 | 163 | 92 | 38 |
| | 1 | 2 | 38 | 164 | 92 | 38 |
| | 1 | 3 | 38 | 165 | 92 | 38 |

The attribute values within row indices 162-165 and row indices 166-175 in RD 282 (shown in FIG. 38), representing a View, are sent as a payload in message 261 to Communicator 210. In an embodiment, the message identifies a system 280 to process the payload. Communicator 210 sends the payload within message 261 to system 280. System 280 converts identifiers within the payload to the alternate identifiers associated with system 280.

In an embodiment, system 280 is a display system with alternate identifiers represented, in part, in CI 26 of row indices 57-65 in RD 282 shown in FIG. 24. In another embodiment, system 280 is a microcontroller system for a printer, with alternate identifiers represented, in part, in CI 26 of row indices 120-124 in RD 282 shown in FIG. 31.

8. Example Processing Device

Figure 3:
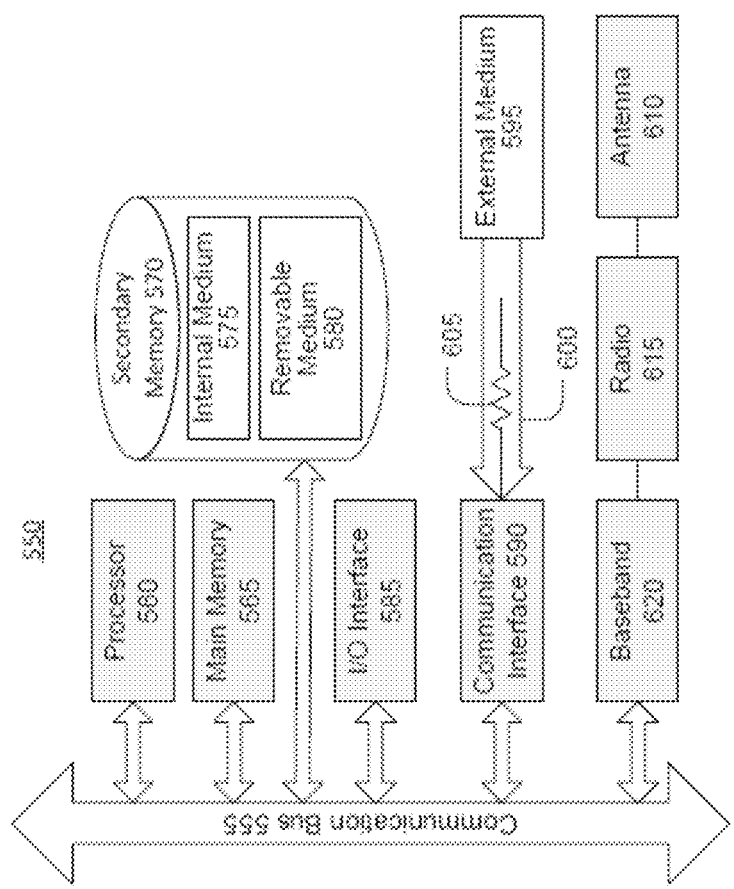
FIG. 3 illustrates a processing system on which one or more of the processes described herein may be executed, according to at least one embodiment.
Figure 4:
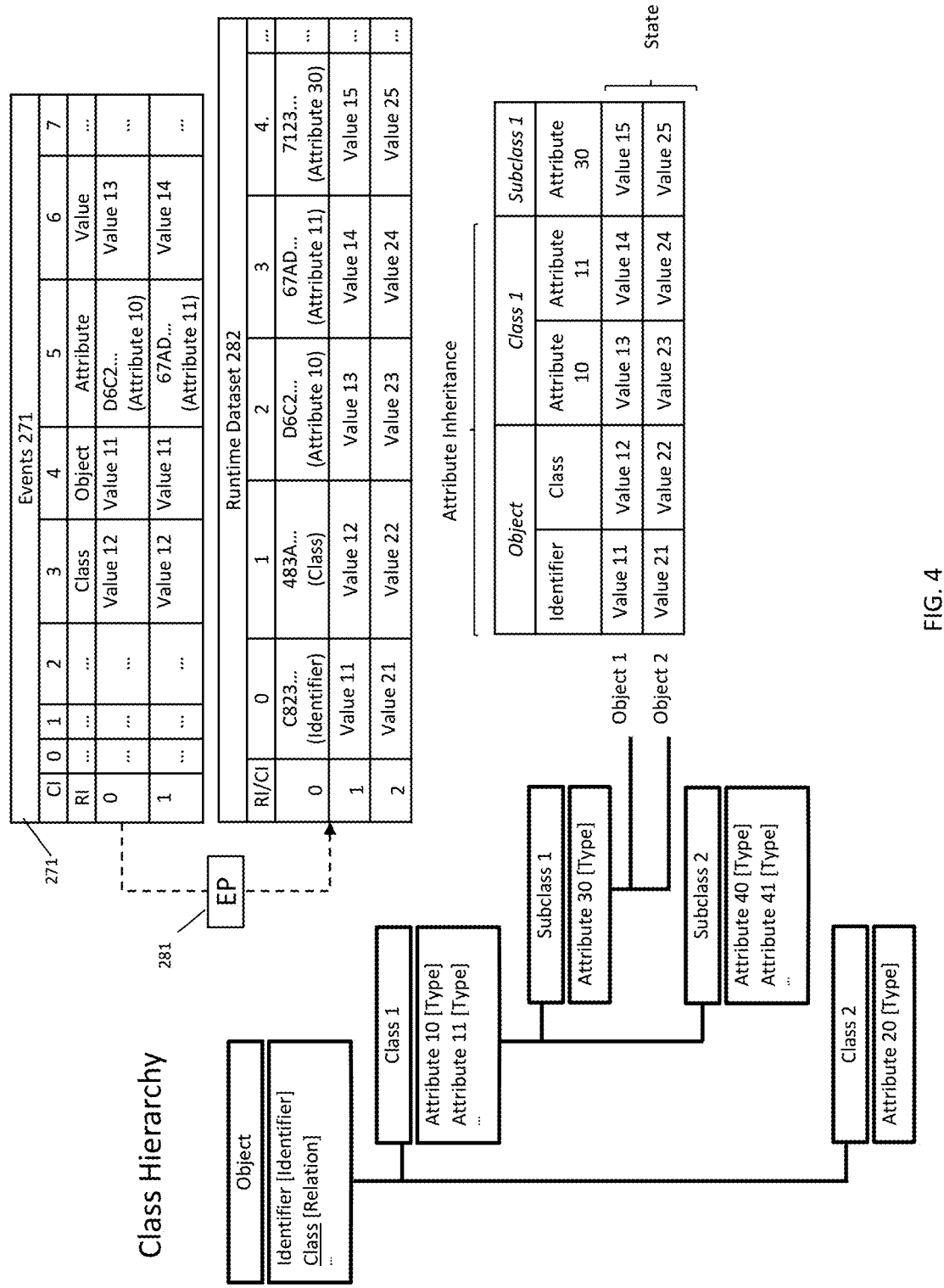
FIG. 4 illustrates a standardized classification of top-level, cross-domain concepts that support broad semantic interoperability among interdependent, domain-specific ontologies and use cases. Each concept represents a general category of like things or objects which can be uniquely identified. Collectively, these concepts represent physical objects (e.g., persons and devices), information objects (e.g., locations and systems), and ontology objects themselves (e.g., information model). Each class (e.g., concept) is defined to reflect the attributes, restrictions, and relationships unique to its objects. A class may be a subclass (type) of another class, forming a class hierarchy that can be as deep as needed. All subclasses inherit the attributes of its upper (super) class. For example, "Subclass 1" inherits "Attribute 10" and "Attribute 11" of "Class 1". An attribute is attached at the most general class applicable to all its objects, including subclasses. Since all classes are types of objects, the class hierarchy has one root "Object" class which comprises attributes that are inherited by all objects. (Subclass 1" also inherits attributes of the Object class.) Each object is an instance of its class ("Object 1" and "Object 2" are instances of "Subclass 1"), and comprises values representing the state of attributes within its class and those it inherits.
Figure 5:
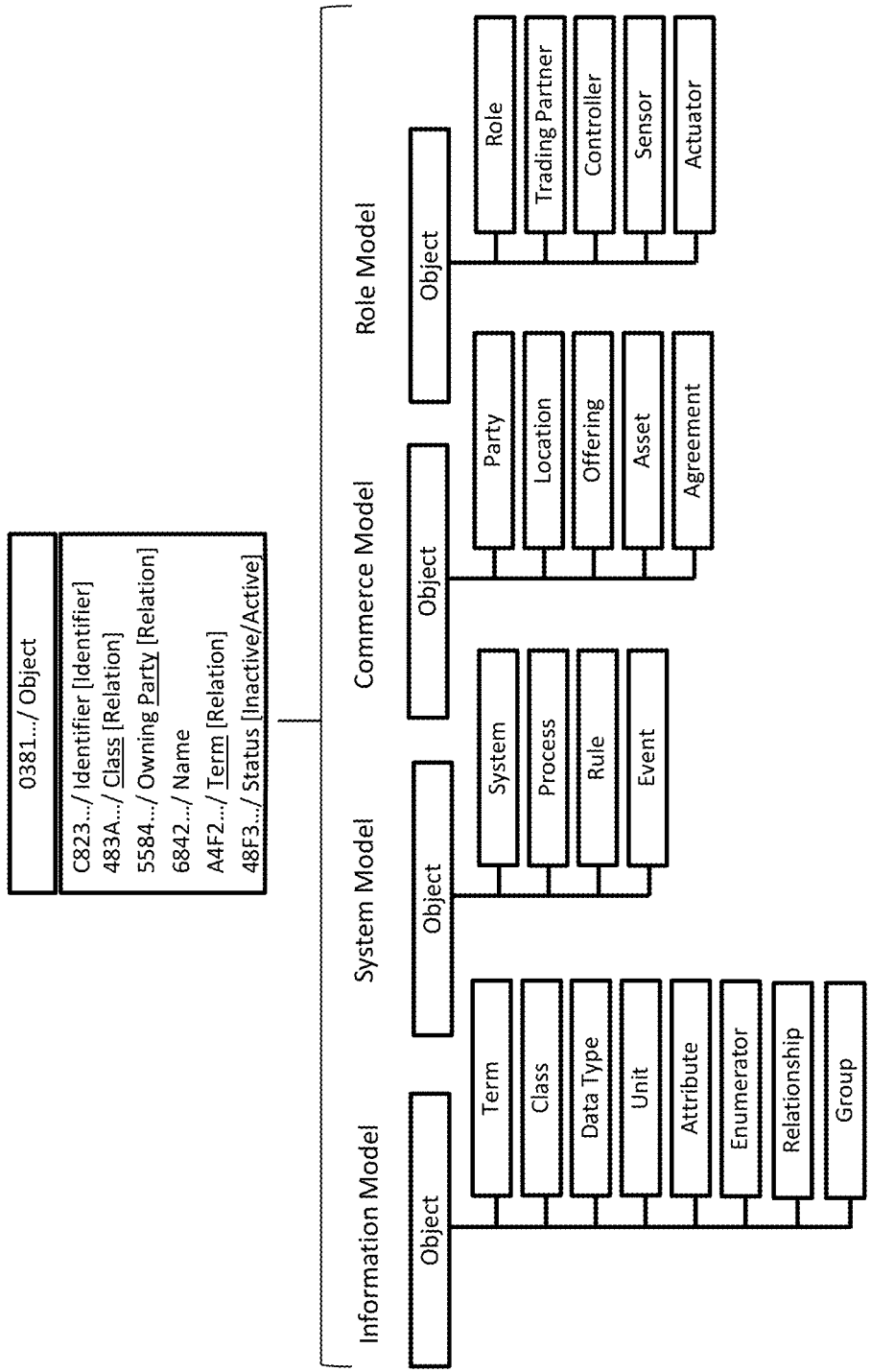
FIGS. 5-11 illustrate a top-level common ontology, including classes, attributes, and relationships that form information, system, commerce, and role models, with a root object class. An example value of the "Identifier" attribute of the root Object class is shown to the left of the "/", with the right side comprising the name or term of the object. A relationship is indicated by the underlined portion of the attribute name, which corresponds to the related class.
Figure 6:
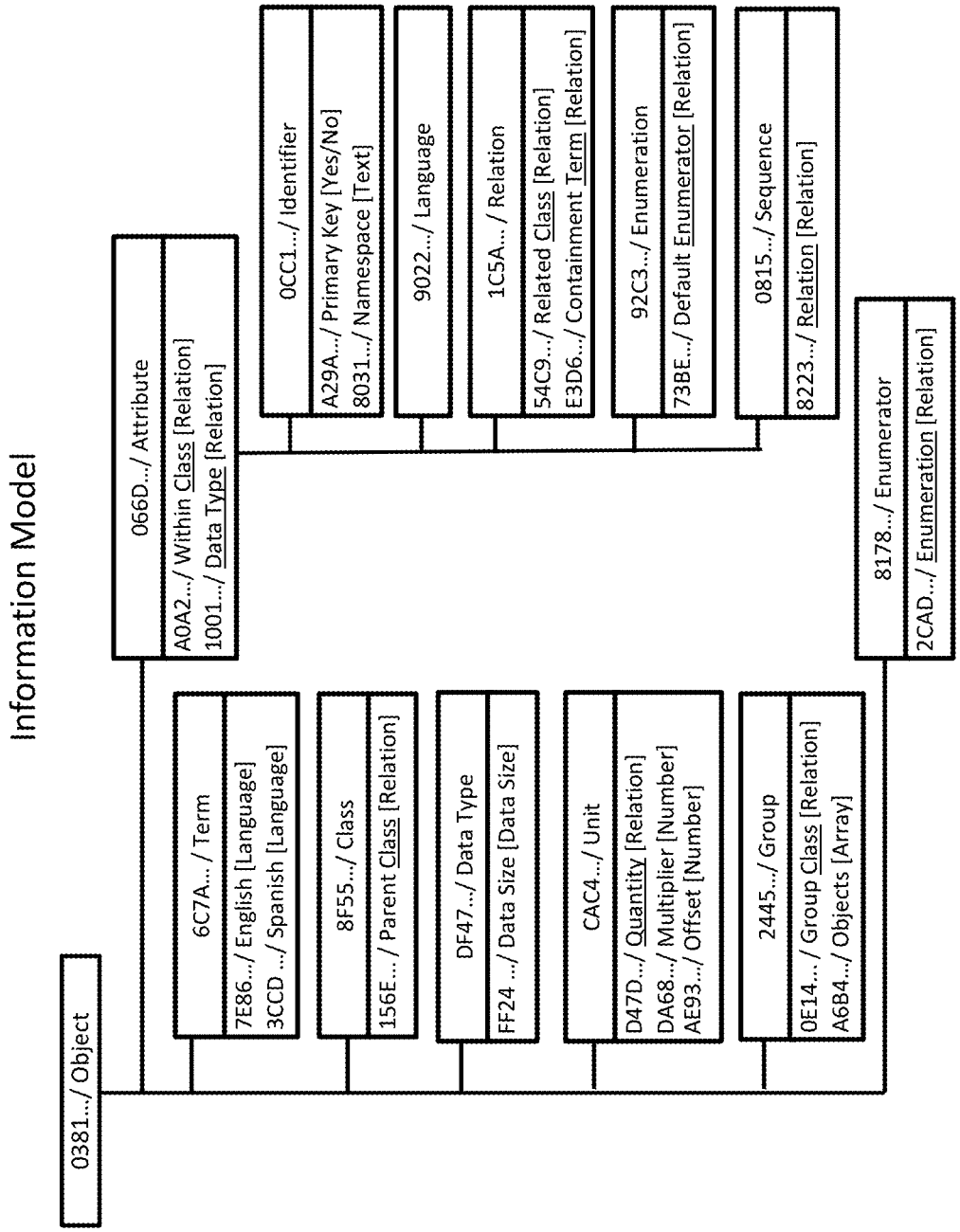
Figure 7:
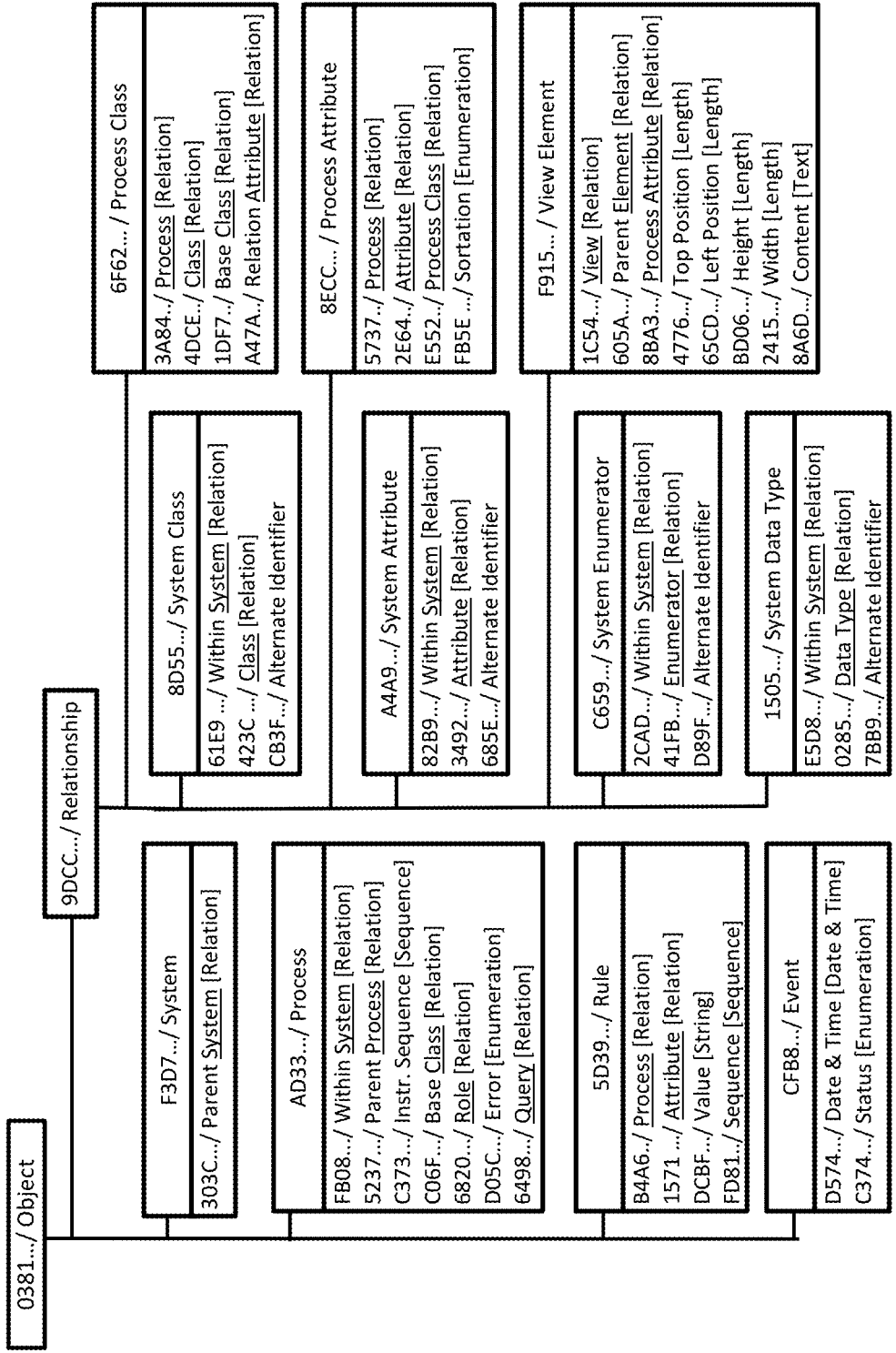

FIG. 3 is a block diagram illustrating an example wired or wireless system 550 that may be used in connection with various embodiments described herein. For example the system 550 may be used as or in conjunction with one or more of the mechanisms, processes, methods, or functions (e.g., to store and/or execute the application or one or more software modules of the application) described above, and may represent components of server(s), user system(s), and/or other devices described herein. The system 550 can be a server or any conventional personal computer, or any other processor-enabled device that is capable of wired or wireless data communication. Other computer systems and/or or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, California.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer-executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g., printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs or software, such as the disclosed application) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the disclosed embodiments as previously described.

In this description, the term "computer-readable medium" is used to refer to any non-transitory computer-readable storage media used to provide computer-executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer-readable mediums are means for providing executable code, programming instructions, and software to the system 550.

In an embodiment that is implemented using software, the software may be stored on a computer-readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615, and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the disclosed embodiments as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for synchronizing a runtime state of distributed systems, the method comprising the steps of, using at least one hardware processor:

from a first system on a first computing device, accessing a first event dataset comprising a two-dimensional data structure having an at least one row and a plurality of columns, wherein each of the at least one row represents a discrete event triggered by a change in state of an event-defined object and comprises a first column containing a timestamp associated with a time at which the change in state of said object occurred, a second column containing an event source identifier corresponding to a second system on a second computing device from which said event originated, a third column containing an object class identifier corresponding to a category of objects sharing the same attributes as said object, a fourth column containing an object identifier corresponding to said object, a fifth column containing an attribute identifier corresponding to an at least one attribute of said object, and a sixth column containing an attribute value corresponding to the attribute identifier in the fifth column, such that the first event dataset defines a state and associated characteristics of at least one object, representing an event-defined object, at one or more points in time based on the timestamp within each row, wherein the state and associated characteristics of the at least one object represent a model of a third system, wherein the model comprises event-defined objects representing processes and characteristics of information managed and processed by the third system, wherein a type of information defined within the model defines the characteristics of a type of physical entity;

from the first system on the first computing device, sending the first event dataset to a fourth system; and from the fourth system:

generating a runtime dataset based on the first event dataset, the runtime dataset representing an instance of the third system and comprising a two-dimensional data structure having a plurality of rows and a plurality of columns;

populating a first row of the runtime dataset with each unique attribute identifier from the first event dataset, such that each unique attribute identifier is contained in a sequential one of the columns of the runtime dataset, thereby defining a column index;

populating a first column of the runtime dataset with each unique object identifier from the first event dataset, such that each unique object identifier is contained in a sequential one of the rows of the runtime dataset, thereby defining a row index wherein the location of a given attribute value within the runtime dataset is derived from a column index and a row index;

populating a remainder of the runtime dataset with the attribute values from the first event dataset, such that the location of each attribute value within the runtime dataset is derived from the column index corresponding to the attribute identifier associated with said attribute value in the first event dataset and the row index corresponding to the object identifier associated with said attribute value in the first event dataset;

receiving a second event dataset comprising a two-dimensional data structure having an at least one row and a plurality of columns, similar to the first event dataset, wherein each of the at least one row represents a discrete event triggered by a change in state of an event-defined object and comprises a first column containing a timestamp associated with a time at which the change in state of said object occurred, a second column containing an event source identifier corresponding to a fifth system on a fifth computing device from which said event originated, a third column containing an object class identifier corresponding to a category of objects sharing the same attributes as said object, a fourth column containing an object identifier corresponding to said object, a fifth column containing an attribute identifier corresponding to an at least one attribute of said object, and a sixth column containing an attribute value corresponding to the attribute identifier in the fifth column, such that the second event dataset defines a state and associated characteristics of at least one object at one or more points in time based on the timestamp within each row; and processing each row in the second event dataset that satisfies conditions associated with one or more processes within the runtime dataset by performing at least one of:

creating a new column within the runtime dataset representing an attribute, creating a new row within the runtime dataset representing an object, setting an attribute value within the runtime dataset, deleting a row within the runtime dataset representing an object, changing the state of the physical entity associated with the system instance, appending a row to a third event dataset representing a state change of the system instance, and sending the third event dataset to one or more systems for processing;

wherein a change in state can occur when an event-defined object is initially created.

2. The method of claim 1, wherein one or more of the second, third, fourth and fifth systems is the same as the first system.

3. The method of claim 1, wherein the second computing device is the same as the first computing device.

4. A system for synchronizing a runtime state of distributed systems, the system comprising:

a first system on a first computing device configured for accessing a first event dataset comprising a two-dimensional data structure having an at least one row and a plurality of columns, wherein each of the at least one row represents a discrete event triggered by a change in state of an event-defined object and comprises a first column containing a timestamp associated with a time at which the change in state of said object occurred, a second column containing an event source identifier corresponding to a second system on a second computing device from which said event originated, a third column containing an object class identifier corresponding to a category of objects sharing the same attributes as said object, a fourth column containing an object identifier corresponding to said object, a fifth column containing an attribute identifier corresponding to an at least one attribute of said object, and a sixth column containing an attribute value corresponding to the attribute identifier in the fifth column, such that the first event dataset defines a state and associated characteristics of at least one object, representing an event-defined object, at one or more points in time based on the timestamp within each row, wherein the state and associated characteristics of the at least one object represent a model of a third system, wherein the model comprises event-defined objects representing processes and characteristics of information managed and processed by the third system, wherein a type of information defined within the model defines the characteristics of a type of physical entity;

the first system further configured for sending the first event dataset to a fourth system; and the fourth system configured for:

generating a runtime dataset based on the first event dataset, the runtime dataset representing an instance of the third system and comprising a two-dimensional data structure having a plurality of rows and a plurality of columns;

populating a first row of the runtime dataset with each unique attribute identifier from the first event dataset, such that each unique attribute identifier is contained in a sequential one of the columns of the runtime dataset, thereby defining a column index;

populating a first column of the runtime dataset with each unique object identifier from the first event dataset, such that each unique object identifier is contained in a sequential one of the rows of the runtime dataset, thereby defining a row index wherein the location of a given attribute value within the runtime dataset is derived from a column index and a row index;

populating a remainder of the runtime dataset with the attribute values from the first event dataset, such that the location of each attribute value within the runtime dataset is derived from the column index corresponding to the attribute identifier associated with said attribute value in the first event dataset and the row index corresponding to the object identifier associated with said attribute value in the first event dataset;

receiving a second event dataset comprising a two-dimensional data structure having an at least one row and a plurality of columns, similar to the first event dataset, wherein each of the at least one row represents a discrete event triggered by a change in state of an event-defined object and comprises a first column containing a timestamp associated with a time at which the change in state of said object occurred, a second column containing an event source identifier corresponding to a fifth system on a fifth computing device from which said event originated, a third column containing an object class identifier corresponding to a category of objects sharing the same attributes as said object, a fourth column containing an object identifier corresponding to said object, a fifth column containing an attribute identifier corresponding to an at least one attribute of said object, and a sixth column containing an attribute value corresponding to the attribute identifier in the fifth column, such that the second event dataset defines a state and associated characteristics of at least one object at one or more points in time based on the timestamp within each row; and processing each row in the second event dataset that satisfies conditions associated with one or more processes within the runtime dataset by performing at least one of:
creating a new column within the runtime dataset representing an attribute,
creating a new row within the runtime dataset representing an object,
setting an attribute value within the runtime dataset,
deleting a row within the runtime dataset representing an object,
changing the state of the physical entity associated with the system instance,
appending a row to a third event dataset representing a state change of the system instance, and
sending the third event dataset to one or more systems for processing;

wherein a change in state can occur when an event-defined object is initially created.

5. The system of claim 4, wherein one or more of the second, third, fourth and fifth systems is the same as the first system.

6. The system of claim 4, wherein the second computing device is the same as the first computing device.

7. A non-transitory computer readable medium containing program instructions for causing an at least one computing device to perform a method for synchronizing a runtime state of distributed systems, the method comprising the steps of:

from a first system on a first computing device, accessing a first event dataset comprising a two-dimensional data structure having an at least one row and a plurality of columns, wherein each of the at least one row represents a discrete event triggered by a change in state of an event-defined object and comprises a first column containing a timestamp associated with a time at which the change in state of said object occurred, a second column containing an event source identifier corresponding to a second system on a second computing device from which said event originated, a third column containing an object class identifier corresponding to a category of objects sharing the same attributes as said object, a fourth column containing an object identifier corresponding to said object, a fifth column containing an attribute identifier corresponding to an at least one attribute of said object, and a sixth column containing an attribute value corresponding to the attribute identifier in the fifth column, such that the first event dataset defines a state and associated characteristics of at least one object, representing an event-defined object, at one or more points in time based on the timestamp within each row, wherein the state and associated characteristics of the at least one object represent a model of a third system, wherein the model comprises event-defined objects representing processes and characteristics of information managed and processed by the third system, wherein a type of information defined within the model defines the characteristics of a type of physical entity;

from the first system on the first computing device, sending the first event dataset to a fourth system; and from the fourth system:
generating a runtime dataset based on the first event dataset, the runtime dataset representing an instance of the third system and comprising a two-dimensional data structure having a plurality of rows and a plurality of columns;

populating a first row of the runtime dataset with each unique attribute identifier from the first event dataset, such that each unique attribute identifier is contained in a sequential one of the columns of the runtime dataset, thereby defining a column index;

populating a first column of the runtime dataset with each unique object identifier from the first event dataset, such that each unique object identifier is contained in a sequential one of the rows of the runtime dataset, thereby defining a row index wherein the location of a given attribute value within the runtime dataset is derived from a column index and a row index;

populating a remainder of the runtime dataset with the attribute values from the first event dataset, such that the location of each attribute value within the runtime dataset is derived from the column index corresponding to the attribute identifier associated with said attribute value in the first event dataset and the row index corresponding to the object identifier associated with said attribute value in the first event dataset;

receiving a second event dataset comprising a two-dimensional data structure having an at least one row and a plurality of columns, similar to the first event dataset, wherein each of the at least one row represents a discrete event triggered by a change in state of an event-defined object and comprises a first column containing a timestamp associated with a time at which the change in state of said object occurred, a second column containing an event source identifier corresponding to a fifth system on a fifth computing device from which said event originated, a third column containing an object class identifier corresponding to a category of objects sharing the same attributes as said object, a fourth column containing an object identifier corresponding to said object, a fifth column containing an attribute identifier corresponding to an at least one attribute of said object, and a sixth column containing an attribute value corresponding to the attribute identifier in the fifth column, such that the second event dataset defines a state and associated characteristics of at least one object at one or more points in time based on the timestamp within each row; and processing each row in the second event dataset that satisfies conditions associated with one or more processes within the runtime dataset by performing at least one of:
   creating a new column within the runtime dataset representing an attribute,
   creating a new row within the runtime dataset representing an object,
   setting an attribute value within the runtime dataset,
   deleting a row within the runtime dataset representing an object,
   changing the state of the physical entity associated with the system instance,
   appending a row to a third event dataset representing a state change of the system instance, and
   sending the third event dataset to one or more systems for processing;

wherein a change in state can occur when an event-defined object is initially created.

8. The method of claim 7, wherein one or more of the second, third, fourth and fifth systems is the same as the first system.

9. The method of claim 7, wherein the second computing device is the same as the first computing device.

* * * * *